(12) United States Patent
Tajalli

(10) Patent No.: US 10,608,847 B2
(45) Date of Patent: Mar. 31, 2020

(54) MULTI-STAGE SAMPLER WITH INCREASED GAIN

(71) Applicant: Kandou Labs, S.A., Lausanne (CH)

(72) Inventor: Armin Tajalli, Salt Lake City, UT (US)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/268,303

(22) Filed: Feb. 5, 2019

(65) Prior Publication Data

US 2019/0182081 A1  Jun. 13, 2019

Related U.S. Application Data

(63) Continuation of application No. 15/792,696, filed on Oct. 24, 2017, now Pat. No. 10,200,218.

(60) Provisional application No. 62/512,744, filed on May 31, 2017, provisional application No. 62/509,713, filed on May 22, 2017, provisional application No. 62/411,920, filed on Oct. 24, 2016.

(51) Int. Cl.
*H04L 25/03* (2006.01)
*H04L 7/02* (2006.01)

(52) U.S. Cl.
CPC .......... *H04L 25/03267* (2013.01); *H04L 7/02* (2013.01); *H04L 25/03146* (2013.01); *H04L 25/03286* (2013.01); *H04L 2025/03445* (2013.01); *H04L 2025/03522* (2013.01)

(58) Field of Classification Search
CPC ................ H04L 25/03267; H04L 7/02; H04L 25/03146; H04L 25/03286
USPC ........................................................ 375/229
See application file for complete search history.

(56) References Cited

U.S. PATENT DOCUMENTS

| | | | |
|---|---|---|---|
| 3,636,463 A | 1/1972 | Ongkiehong | |
| 3,824,494 A | 7/1974 | Wilcox | |
| 3,939,468 A | 2/1976 | Mastin | |
| 4,276,543 A | 6/1981 | Miller et al. | |
| 4,774,498 A | 9/1988 | Traa | |
| 4,897,657 A | 1/1990 | Brubaker | |

(Continued)

FOREIGN PATENT DOCUMENTS

WO  2018052657 A1  3/2018

OTHER PUBLICATIONS

Anadigm, "Using the Anadigm Multiplier CAM", Design Brief 208, www.anadigm.com, Copyright 2002, 2002, (6 pages).

(Continued)

*Primary Examiner* — Michael R Neff
(74) *Attorney, Agent, or Firm* — Invention Mine LLC

(57) ABSTRACT

Generating first and second discharge control signals in response to a clock signal and an input voltage signal, the first and second discharge control signals decreasing at different rates to a threshold level during a first time period, wherein a difference in rates is determined by the input voltage signal, generating a differential voltage on a pair of nodes during the first time period by selectively controlling a respective amount of discharge of an initial charge on each node of the pair of nodes by applying the first and second discharge control signals to respective transistors in a differential transistor pair connected to the pair of nodes, and maintaining the differential voltage on the pair of nodes during a subsequent time period, and generating an amplified differential voltage during at least a portion of the subsequent time period by amplifying the differential voltage.

20 Claims, 33 Drawing Sheets

(56) References Cited

U.S. PATENT DOCUMENTS

| | | |
|---|---|---|
| 5,017,924 A | 5/1991 | Guiberteau et al. |
| 5,459,465 A | 10/1995 | Kagey |
| 5,510,736 A | 4/1996 | Van |
| 5,748,948 A | 5/1998 | Yu et al. |
| 5,945,935 A | 8/1999 | Kusumoto et al. |
| 6,226,330 B1 | 5/2001 | Mansur |
| 6,232,908 B1 | 5/2001 | Nakaigawa |
| 6,346,907 B1 | 2/2002 | Dacy et al. |
| 6,384,758 B1 | 5/2002 | Michalski et al. |
| 6,396,329 B1 | 5/2002 | Zerbe |
| 6,400,302 B1 | 6/2002 | Amazeen et al. |
| 6,424,630 B1 | 7/2002 | Ang |
| 6,462,584 B1 | 10/2002 | Proebsting |
| 6,563,382 B1 | 5/2003 | Yang |
| 6,624,699 B2 | 9/2003 | Yin et al. |
| 6,839,587 B2 | 1/2005 | Ponce |
| 6,879,816 B2 | 4/2005 | Bult et al. |
| 6,888,483 B2 | 5/2005 | Mulder |
| 6,972,701 B2 | 12/2005 | Jansson |
| 7,075,996 B2 | 7/2006 | Simon et al. |
| 7,167,523 B2 | 1/2007 | Mansur |
| 7,188,199 B2 | 3/2007 | Leung et al. |
| 7,199,728 B2 | 4/2007 | Dally et al. |
| 7,269,212 B1 | 9/2007 | Chau et al. |
| 7,285,977 B2 | 10/2007 | Kim |
| 7,372,390 B2 | 5/2008 | Yamada |
| 7,397,302 B2 | 7/2008 | Bardsley et al. |
| 7,528,758 B2 | 5/2009 | Ishii |
| 7,656,321 B2 | 2/2010 | Wang |
| 7,683,720 B1 | 3/2010 | Yehui et al. |
| 7,688,102 B2 | 3/2010 | Bae et al. |
| 7,697,915 B2 | 4/2010 | Behzad et al. |
| 7,804,361 B2 | 9/2010 | Lim et al. |
| 7,957,472 B2 | 6/2011 | Wu et al. |
| 8,000,664 B2 | 8/2011 | Khorram |
| 8,030,999 B2 | 10/2011 | Chatterjee et al. |
| 8,106,806 B2 | 1/2012 | Toyomura et al. |
| 8,159,375 B2 | 4/2012 | Abbasfar |
| 8,159,376 B2 | 4/2012 | Abbasfar |
| 8,183,930 B2 | 5/2012 | Kawakami et al. |
| 8,547,272 B2 | 10/2013 | Nestler et al. |
| 8,581,824 B2 | 11/2013 | Baek et al. |
| 8,604,879 B2 | 12/2013 | Mourant et al. |
| 8,643,437 B2 | 2/2014 | Chiu et al. |
| 8,674,861 B2 | 3/2014 | Matsuno et al. |
| 8,687,968 B2 | 4/2014 | Nosaka et al. |
| 8,791,735 B1 | 7/2014 | Shibasaki |
| 8,841,936 B2 | 9/2014 | Nakamura |
| 8,860,590 B2 | 10/2014 | Yamagata et al. |
| 9,069,995 B1 | 6/2015 | Cronie |
| 9,106,465 B2 | 8/2015 | Walter |
| 9,148,087 B1 | 9/2015 | Tajalli |
| 9,178,503 B2 | 11/2015 | Hsieh |
| 9,281,785 B2 | 3/2016 | Sjöland |
| 9,292,716 B2 | 3/2016 | Winoto et al. |
| 9,300,503 B1 | 3/2016 | Holden et al. |
| 10,003,315 B2 | 6/2018 | Tajalli |
| 2001/0006538 A1 | 7/2001 | Simon et al. |
| 2002/0050861 A1 | 5/2002 | Nguyen et al. |
| 2002/0149508 A1 | 10/2002 | Hamashita |
| 2002/0149805 A1 | 10/2002 | Tanaka et al. |
| 2002/0158789 A1 | 10/2002 | Yoshioka et al. |
| 2002/0174373 A1 | 11/2002 | Chang |
| 2003/0016763 A1 | 1/2003 | Doi et al. |
| 2003/0085763 A1 | 5/2003 | Schrodinger et al. |
| 2003/0132791 A1 | 7/2003 | Hsieh |
| 2003/0160749 A1 | 8/2003 | Tsuchi |
| 2003/0174023 A1 | 9/2003 | Miyasita |
| 2003/0184459 A1 | 10/2003 | Engl |
| 2003/0218558 A1 | 11/2003 | Mulder |
| 2004/0027185 A1 | 2/2004 | Fiedler |
| 2004/0169529 A1 | 9/2004 | Afghani et al. |
| 2005/0057379 A1 | 3/2005 | Jansson |
| 2005/0270098 A1 | 12/2005 | Zhang et al. |
| 2006/0036668 A1 | 2/2006 | Jaussi et al. |
| 2006/0097786 A1 | 5/2006 | Su et al. |
| 2006/0103463 A1 | 5/2006 | Lee et al. |
| 2006/0192598 A1 | 8/2006 | Baird et al. |
| 2006/0194598 A1 | 8/2006 | Kim et al. |
| 2007/0009018 A1 | 1/2007 | Wang |
| 2007/0176708 A1 | 8/2007 | Otsuka et al. |
| 2007/0182487 A1 | 8/2007 | Ozasa et al. |
| 2007/0188367 A1 | 8/2007 | Yamada |
| 2007/0201546 A1 | 8/2007 | Lee |
| 2008/0001626 A1 | 1/2008 | Bae et al. |
| 2008/0187037 A1 | 8/2008 | Bulzacchelli et al. |
| 2009/0090333 A1 | 4/2009 | Spadafora et al. |
| 2009/0115523 A1 | 5/2009 | Akizuki et al. |
| 2009/0323864 A1 | 12/2009 | Tired |
| 2010/0148819 A1 | 6/2010 | Bae et al. |
| 2010/0156691 A1 | 6/2010 | Taft |
| 2010/0219781 A1 | 9/2010 | Kuwamura |
| 2010/0220828 A1 | 9/2010 | Fuller et al. |
| 2010/0235673 A1 | 9/2010 | Abbasfar |
| 2010/0271107 A1 | 10/2010 | Tran et al. |
| 2011/0028089 A1 | 2/2011 | Komori |
| 2011/0032977 A1 | 2/2011 | Hsiao et al. |
| 2011/0051854 A1 | 3/2011 | Kizer et al. |
| 2011/0057727 A1 | 3/2011 | Cranford et al. |
| 2011/0096054 A1 | 4/2011 | Cho et al. |
| 2011/0103508 A1 | 5/2011 | Mu et al. |
| 2011/0133816 A1 | 6/2011 | Wu et al. |
| 2011/0156819 A1 | 6/2011 | Kim et al. |
| 2012/0025911 A1 | 2/2012 | Zhao et al. |
| 2012/0044021 A1 | 2/2012 | Yeh et al. |
| 2012/0133438 A1 | 5/2012 | Tsuchi et al. |
| 2013/0106513 A1 | 5/2013 | Cyrusian et al. |
| 2013/0114663 A1 | 5/2013 | Ding et al. |
| 2013/0147553 A1 | 6/2013 | Iwamoto |
| 2013/0195155 A1 | 8/2013 | Pan et al. |
| 2013/0215954 A1 | 8/2013 | Beukema et al. |
| 2013/0259113 A1 | 10/2013 | Kumar |
| 2013/0322512 A1 | 12/2013 | Francese et al. |
| 2013/0334985 A1 | 12/2013 | Kim et al. |
| 2014/0119479 A1 | 5/2014 | Tajalli |
| 2014/0176354 A1 | 6/2014 | Yang |
| 2014/0177696 A1 | 6/2014 | Hwang |
| 2014/0203794 A1 | 7/2014 | Pietri et al. |
| 2014/0266440 A1 | 9/2014 | Itagaki et al. |
| 2014/0312876 A1 | 10/2014 | Hanson et al. |
| 2015/0070201 A1 | 3/2015 | Dedic et al. |
| 2015/0146771 A1 | 5/2015 | Walter |
| 2015/0198647 A1 | 7/2015 | Atwood et al. |
| 2015/0319015 A1 | 11/2015 | Malhotra |
| 2016/0013954 A1 | 1/2016 | Shokrollahi et al. |
| 2016/0197747 A1 | 7/2016 | Ulrich et al. |
| 2017/0214374 A1 | 7/2017 | Tajalli |

OTHER PUBLICATIONS

Schneider, J., et al., ""ELEC301 Project: Building an Analog Computer"", http://www.clear.rice.edu/elec301/Projects99/anlgcomp/, Dec. 19, 1999, (9 pages).

Tierney, J., "A Digital Frequency Synthesizer", Audio and Electroacoustics, IEEE Transactions, pp. 48-57, vol. 19, No. 1, Abstract, Mar. 1971, (1 page).

Kim, Kyu-Young, et al., "8 mW 1.65-Gbps continuous-time equalizer with clock attenuation detection for digital display interface", Analog Integrated Circuits and Signal Processing, Kluwer Academic Publishers, vol. 63, No. 2, Oct. 11, 2009, 329-337 (9 pages).

Takahashi, Masayoshi, et al., "A 2-GHz Gain Equalizer for Analog Signal Transmission Using Feedforward Compensation by a Low-Pass Filter", IEICE Transactions on Fundamentals of Electronics, vol. E94A, No. 2, Feb. 2011, 611-616 (6 pages).

Wang, Hui, et al., "Equalization Techniques for High-Speed Serial Interconnect Transceivers", Solid-State and Integrated-Circuit Technology, 9th International Conference on ICSICT, Piscataway, NJ, Oct. 20, 2008, 1-4 (4 pages).

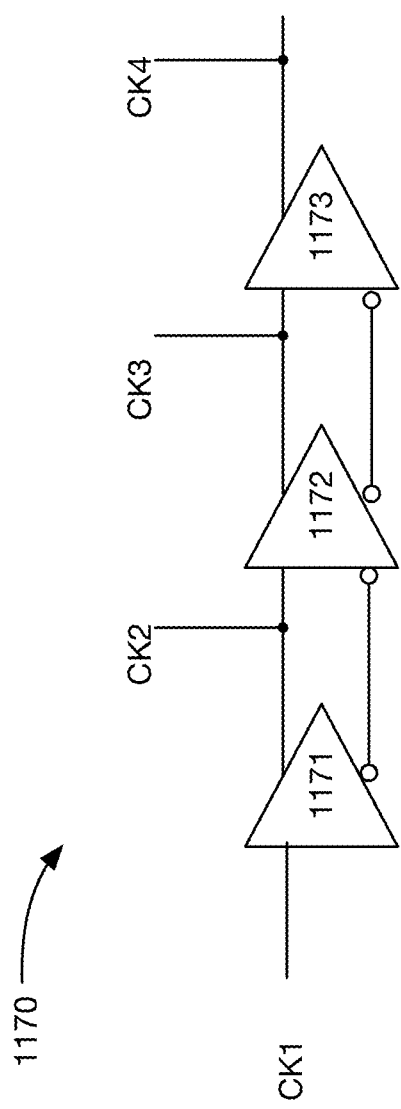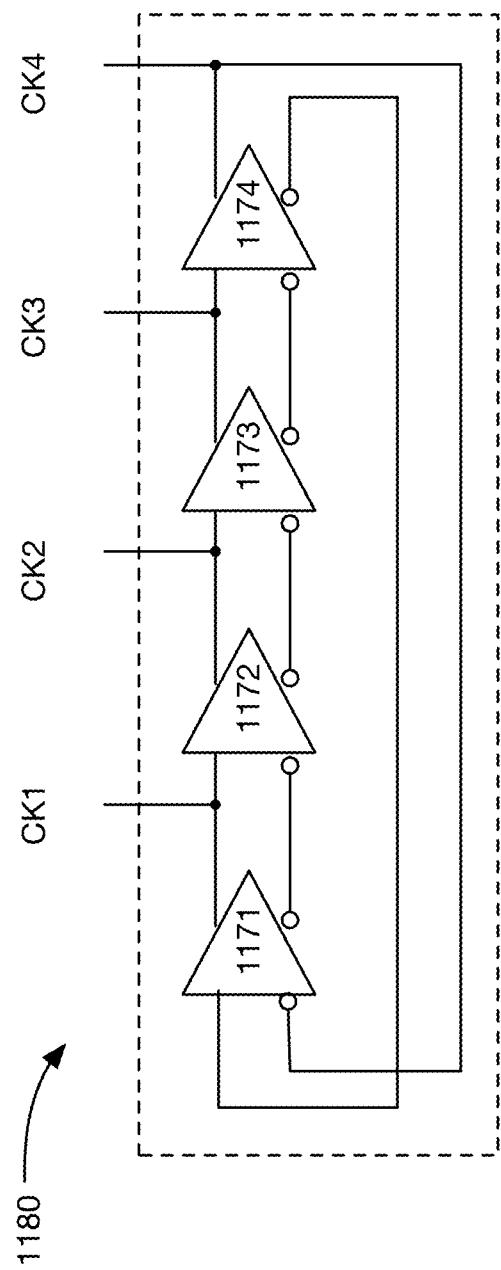
FIG. 11B
FIG. 11C

MULTI-STAGE SAMPLER WITH INCREASED GAIN

CROSS-REFERENCE TO RELATED APPLICATIONS

This application is a continuation of U.S. application Ser. No. 15/792,696, filed Oct. 24, 2017, entitled "Multi-Stage Sampler with Increased Gain," which claims priority to U.S. Provisional Application No. 62/512,744, filed May 31, 2017, entitled "Multi-Stage Sampler with Increased Gain," and to U.S. Provisional Application No. 62/509,713, filed May 22, 2017, entitled "Multi-Stage Sampler with Increased Gain," and U.S. Provisional Application No. 62/411,920, filed Oct. 24, 2016, entitled "Multi-Stage Sampler with Increased Gain", all of which are hereby incorporated herein by reference in their entirety for all purposes.

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. Patent Publication 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II").

U.S. patent application Ser. No. 13/542,599, filed Jul. 5, 2012, naming Armin Tajalli, Harm Cronie, and Amin Shokrollahi entitled "Methods and Circuits for Efficient Processing and Detection of Balanced Codes" (hereafter called "Tajalli I".)

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. Provisional Patent Application No. 61/946,574, filed Feb. 28, 2014, naming Amin Shokrollahi, Brian Holden, and Richard Simpson, entitled "Clock Embedded Vector Signaling Codes", hereinafter identified as [Shokrollahi I].

U.S. patent application Ser. No. 14/612,241, filed Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi II].

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I].

U.S. patent application Ser. No. 14/816,896, filed Aug. 3, 2015, naming Brian Holden and Amin Shokrollahi, entitled "Orthogonal Differential Vector Signaling Codes with Embedded Clock", hereinafter identified as [Holden II].

U.S. patent application Ser. No. 14/926,958, filed Oct. 29, 2015, naming Richard Simpson, Andrew Stewart, and Ali Hormati, entitled "Clock Data Alignment System for Vector Signaling Code Communications Link", hereinafter identified as [Stewart I].

U.S. patent application Ser. No. 14/925,686, filed Oct. 28, 2015, naming Armin Tajalli, entitled "Advanced Phase Interpolator", hereinafter identified as [Tajalli II].

U.S. Provisional Patent Application No. 62/286,717, filed Jan. 25, 2016, naming Armin Tajalli, entitled "Voltage Sampler Driver with Enhanced High-Frequency Gain", hereinafter identified as [Tajalli III].

U.S. Provisional Patent Application No. 62/326,593, filed Apr. 22, 2016, naming Armin Tajalli, entitled "Sampler with Increased Wideband Gain and Extended Evaluation Time", hereinafter identified as [Tajalli IV].

U.S. Provisional Patent Application No. 62/326,591, filed Apr. 22, 2016, naming Armin Tajalli, entitled "High Performance Phase Locked Loop", hereinafter identified as [Tajalli V].

FIELD OF THE INVENTION

The present embodiments relate to communications systems circuits generally, and more particularly to obtaining an instantaneous measurement and filtering of a received signal voltage relative to a provided clock signal, as one component of detecting received communications signals from a high-speed multi-wire interface used for chip-to-chip communication.

BACKGROUND

In modern digital systems, digital information is processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods have been proposed to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals from the transmitter to one or more receivers. At a receiver, the received signals corresponding to the codeword are transformed back into the original digital information representation space. Herein, this process is referred to as "decoding".

Regardless of the encoding method used, the received signals presented to the receiving device must be sampled (or their signal value otherwise recorded) at intervals best representing the original transmitted values, regardless of transmission channel delays, interference, and noise. The timing of this sampling or slicing operation is controlled by an associated Clock and Data Recovery (CDR) timing system, which determines the appropriate sample timing. [Stewart I] and [Tajalli V] provide examples of such CDR systems.

BRIEF DESCRIPTION

Methods and systems are described for generating first and second discharge control signals in response to a clock signal and an input voltage signal, the first and second discharge control signals decreasing at different rates to a threshold level during a first time period, wherein a difference in rates is determined by the input voltage signal, generating a differential voltage on a pair of nodes during the first time period by selectively controlling a respective amount of discharge of an initial charge on each node of the pair of nodes by applying the first and second discharge control signals to respective transistors in a differential transistor pair connected to the pair of nodes, and maintaining the differential voltage on the pair of nodes during a subsequent time period, and generating an amplified differential voltage during at least a portion of the subsequent time period by amplifying the differential voltage.

To reliably detect the data values transmitted over a communications system, a receiver must accurately measure the received signal value amplitudes at carefully selected times. In some embodiments, the value of the received signal is first captured at the selected time using a known sample-and-hold or track-and-hold circuit (or known variants such as amplify-and-hold or integrate-and-hold), and then the resulting value is measured against one or more reference values using a known voltage comparator circuit. Other embodiments first use a comparator to "slice" the analog signal and obtain a digital result, then digitally sample the resulting binary value using a clocked digital latch.

Other embodiments utilize circuits capable of applying both the time- and amplitude-domain constraints, producing a result that represents the input value at a particular time and relative to a provided reference level. [Tajalli III] provides examples of such embodiments, in which the high frequency gain of the sampling circuit may be advantageously boosted over a narrow frequency range, in a so-called high frequency peaking action as graphically illustrated by the gain vs. frequency chart of FIG. 6A.

It is also possible to provide enhanced signal gain over a wide frequency range, as shown by the gain vs. frequency chart of FIG. 6B and described in the embodiments herein. Additional embodiments are described in which the clocked sampling action is further enhanced by reliance on dynamic circuit operation rather than the static mode of operation used in [Tajalli III].

Methods and systems are described for receiving a differential voltage, in response to an initiation of a sampling interval, discharging a first pair of nodes according to the received differential voltage to form a first time-varying voltage differential, generating a second differential voltage by partially discharging a second pair of nodes, the second differential voltage generated according to the first time-varying voltage differential, wherein the discharging of the second pair of nodes is terminated in response to the discharging of the first pair of nodes and the second differential voltage is held for a duration of the sampling interval, discharging a third pair of nodes according to the second differential voltage to form a second time-varying voltage differential, the second time-varying voltage differential larger than the first time-varying voltage differential, and pre-charging the first, second, and third pairs of nodes in response to a termination of the sampling interval.

BRIEF DESCRIPTION OF FIGURES

FIG. 11B is a block diagram of a clock delay circuit, in accordance with some embodiments.

FIG. 11C is a block diagram of a local oscillator generating various phases of a clock circuit, in accordance with some embodiments.

DETAILED DESCRIPTION

To reliably detect the data values transmitted over a communications system, a communications receiver must accurately measure its received signal value amplitudes at carefully selected times, typically at or near the center of that received signal's period of stability between transitions. This point is commonly described as the "center of eye", (referring to the well-known "eye diagram" of signal amplitude vs. clock intervals) and is typically determined by use of a local "receive clock" which is configured to occur at that desirable sampling time. Generation and ongoing control of such receive clock timing is well understood in the art, as Clock Data Alignment (CDA) systems measure and incrementally adjust sample timing versus receive signal stability time to optimize sample timing.

In some embodiments, the value of the received signal is first captured at the selected time using a sample-and-hold or track-and-hold circuit, and then the resulting value is measured against one or more reference values using a known voltage comparator circuit.

Figure 6A:
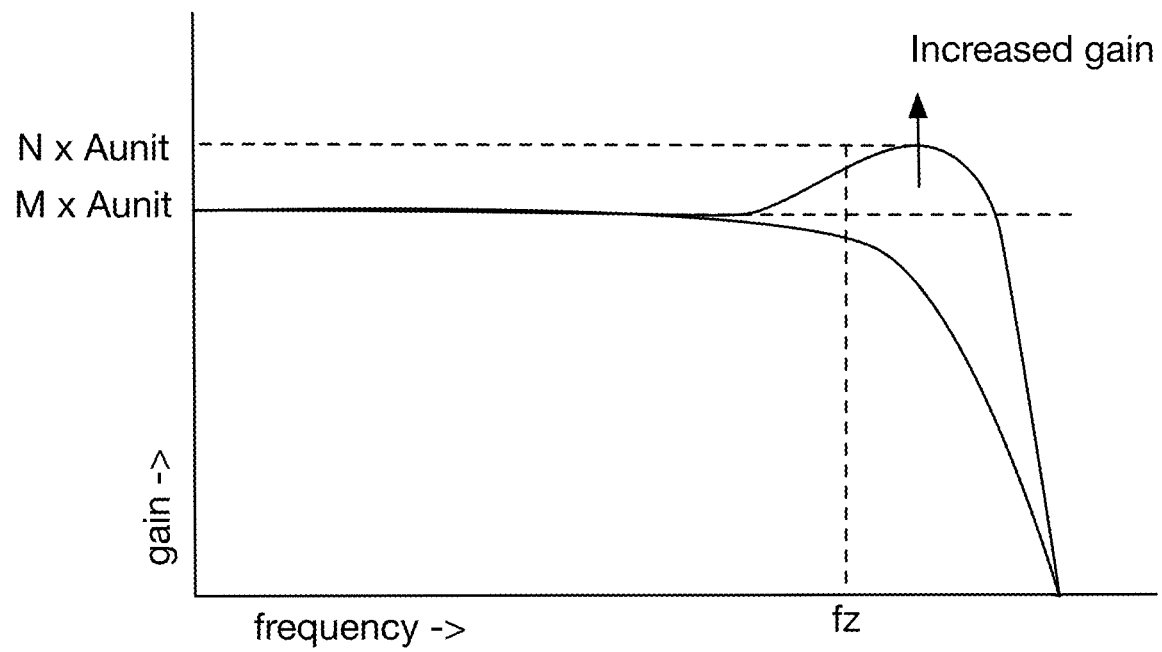
FIG. 6A is a gain vs. frequency plot showing high frequency "peaking" gain enhancement as provided by the circuit of FIG. 1.

Other embodiments utilize circuits capable of applying both the time- and amplitude-domain constraints, producing a result that represents the input value at a particular time and relative to a provided reference level. [Tajalli III] provides examples of such voltage sampler embodiments, in which the high frequency gain of the sampling circuit may be advantageously boosted over a narrow frequency range, in a so-called high frequency peaking action as graphically illustrated by the gain vs. frequency chart of FIG. 6A. Such high frequency peaking is particularly useful in receiver frequency compensation of communications channel characteristics. A further embodiment is described herein, in which the clocked sampling action is further enhanced by reliance on dynamic circuit operation rather than the static mode of operation used in [Tajalli III].

Figure 6B:
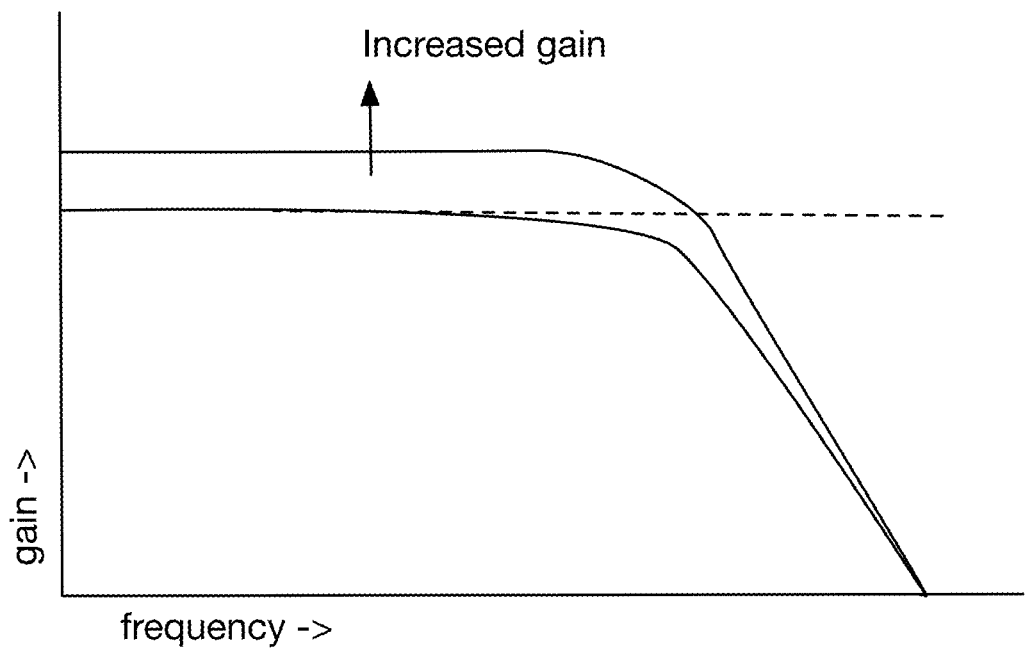
FIG. 6B is a gain vs. frequency plot showing wideband gain enhancement as provided by the circuit of FIG. 2.

Dynamic circuit operation may also be applied to wideband amplification to provide enhanced signal gain over a wide frequency range, as shown by the gain vs. frequency chart of FIG. 6B and described in embodiments herein.

The source of the input signal to the embodiments described herein may be derived from a single wire signal, or may be derived from a weighted linear combination of multiple wire signals, such as provided by a Multi Input Comparator or mixer (MIC) used to detect vector signaling codes.

Sampler with High Frequency Peaking

It is common for communications links to be operated at data transfer rates at or near the declining portion of the link's response vs. frequency curve. Thus, it is desirable for receivers to be configurable to provide additional high frequency gain, as compensation for the reduced response of the communications link.

Figure 1:
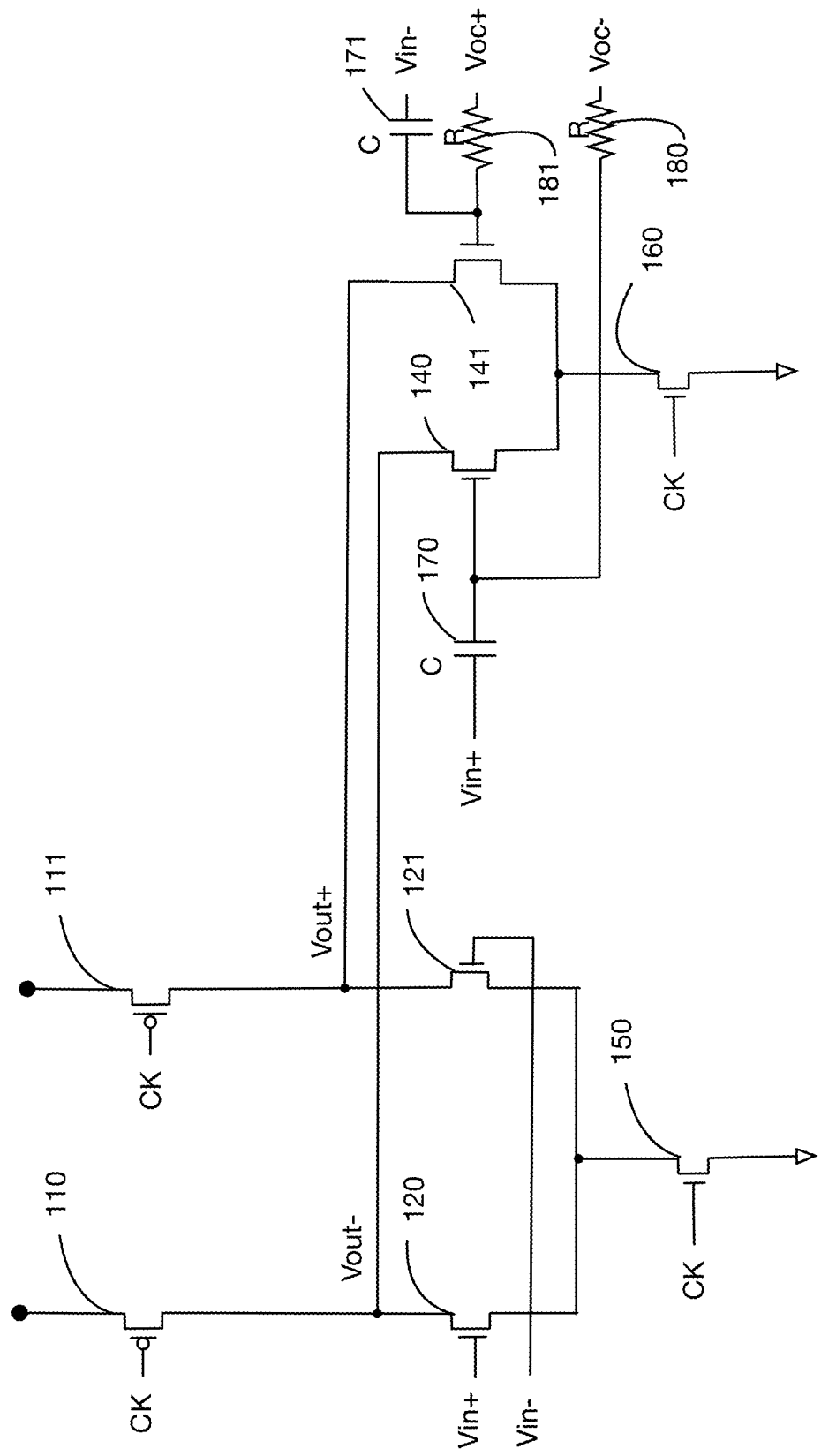
FIG. 1 is a schematic diagram of a voltage sampler with high frequency peaking and offset compensation.

[Tajalli III] provided one example of a sampler circuit capable of providing additional narrowband high frequency gain through use of a secondary gain path enabled by a frequency-selective RC network. The circuit of FIG. 1 provides another embodiment of this type with lower quiescent current draw, due to its reliance on dynamic switching mode in all transistors. Positive cycles of CK turn on transistors 110 and 111 to pre-charge nodes Vout+ and Vout−, with the complementary or inverse phase of CK enabling transistors 150 and 160, allowing the stored charges to flow through the differential transistor pairs 120/121 and 140/141 to ground, those momentary current flows being controlled by the voltage levels presented by inputs Vin+ and Vin−. Because of the non-overlap between charge sources and discharge sinks being on, this circuit draws essentially no quiescent current, and effectively samples input signals at the falling edge of CK.

As with the circuit of [Tajalli III], the parallel differential transistor pair 140/141 provides additional high-frequency peaking in this embodiment and optional offset voltage compensation, as the differential pair inputs are driven by Vin+ and Vin− with a frequency response shaped by high-pass RC filters 170/180, and 171/181 having a corner frequency of $f_z \approx 1/2\pi RC$. Incremental adjustment of offset correction voltages Voc+ and Voc− may be made as necessary to adjust the balance of differential outputs Vout.

As is common practice, $f_z$ will typically be chosen to be at or near the natural high frequency falloff of the received signal amplitude vs. frequency curve to provide the desired peaking characteristic, as illustrated in FIG. 6A.

Sampler with Increased Wideband Gain

Figure 2:
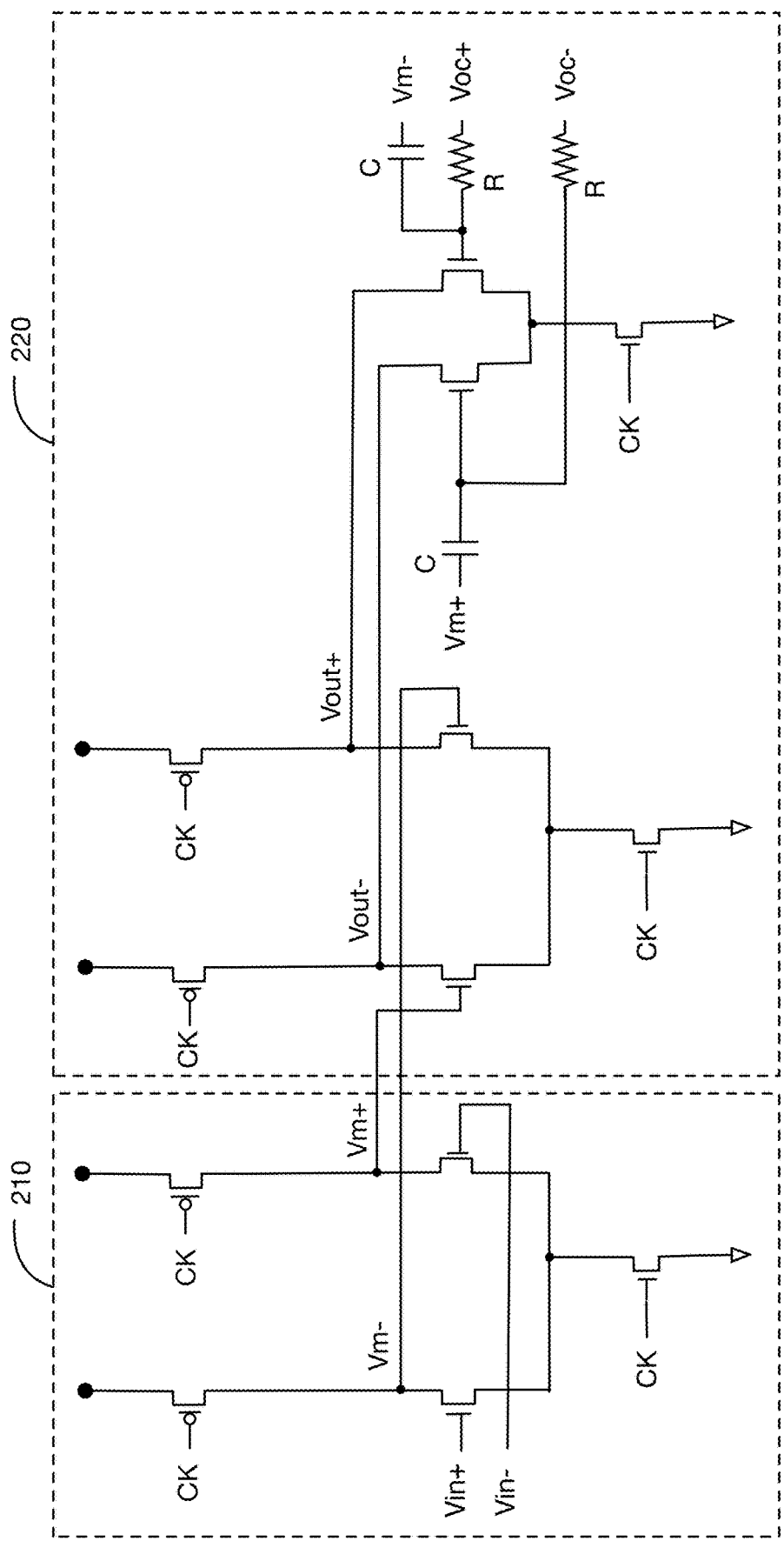
FIG. 2 is a schematic diagram of a voltage sampler embodiment with increased signal gain over a wide frequency range and offset compensation.

The same dynamic mode operation may be used in a sampling circuit with wideband gain, as shown in the schematic of FIG. 2.

Although a similar incremental-linear analysis may be applied here as in the previous example, an alternative interpretation may be of more descriptive value, especially in operational configurations where the clock frequency is significantly higher than corner frequency $f_z$. In this alternative analysis, first stage 210 effectively acts as a high frequency mixer, producing differential output signals Vm+ and Vm− which are effectively the carrier CK mixed with or modulated by differential input Vin. Second stage 220 then effectively acts as a synchronous demodulator, mixing Vm with CK to produce differential outputs Vout again. As the modulated carrier frequencies involved are higher than corner frequency $f_z$, the modulated signals effectively pass unaffected through capacitors C, allowing both differential pairs in 220 to provide gain at all signal frequencies. In one embodiment, the resulting transfer function was seen to be effectively flat over a wide frequency range, as illustrated in FIG. 6B, with approximately 6 dB of additional gain. As in the previous example, incremental adjustment of offset correction voltages Voc+ and Voc− may be made as necessary to adjust the balance of differential outputs Vout.

Sampler with Extended Evaluation Time

In switched dynamic circuits such as that of FIG. 2, the static voltage of internal nodes such as Vm+ and Vm− are dependent not only on the transistor action of the differential pair, but also on the integrating action of the distributed node capacitance on the charge transferred on CK transitions. This integrating behavior can become significant, especially when multiple dynamically clocked stages are cascaded as in this example.

Figure 3:
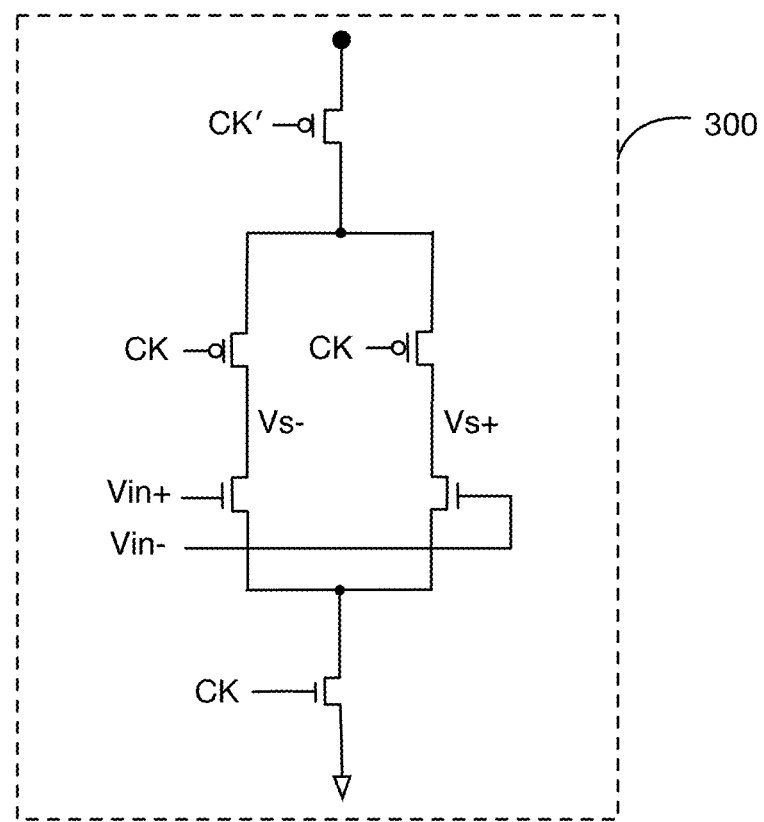
FIG. 3 is a schematic diagram of one embodiment of a dynamic mode CMOS sampling circuit allowing an extended input signal evaluation time.
Figure 3:
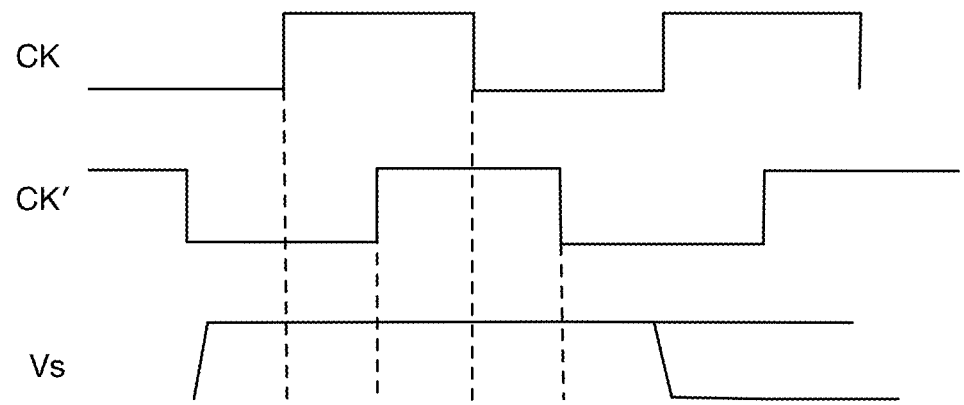

FIG. 3 shows the schematic diagram of a modified version 300 of the previous sampler, in which two partially overlapping clocks CK and CK' are used to obtain extended input evaluation time. For descriptive purposes without implying a limitation, CK and CK' in this explanation are assumed to have an approximate quadrature relationship, as shown in the timing diagram of FIG. 3. In practice, both clocks may be generated by a multiphase clock generator, or one clock may be synthesized from the other using a delay element. During the first 90 degrees of the clock cycle, the sampler is reset by turning on the top three PMOS FETS that charge the Vs nodes to the supply voltage. On the rising edge of CK (during the second 90 degrees of the clock cycle) the Vs outputs take on differential output levels proportionate to the voltage levels seen at Vin− and Vin+, where one side is discharged to ground and the other remains charged at the supply voltage. Those levels remain unchanged while either CK or CK' is high. Specifically, in the third 90 degree portion, the addition of the top PMOS FET driven by the quadrature (or otherwise delayed) clock CK' prevents the recharge/reset action that would have otherwise occurred when CK returns low (turning off the tail current at the bottom and turning on the middle PMOS FETs to recharge Vs). Only after CK' goes low in conjunction with CK during the final 90 degrees do the output nodes Vs+ and Vs− get precharged to high levels during a reset interval Thus, the voltage sample occurs at the rising edge of CK, and is maintained through the falling edge of CK' (rather than merely the falling edge of CK). This extended output duration provides increased set-up time for a subsequent integrator/sampler or latch element.

Cascades of Clocked Samplers

Figure 4:
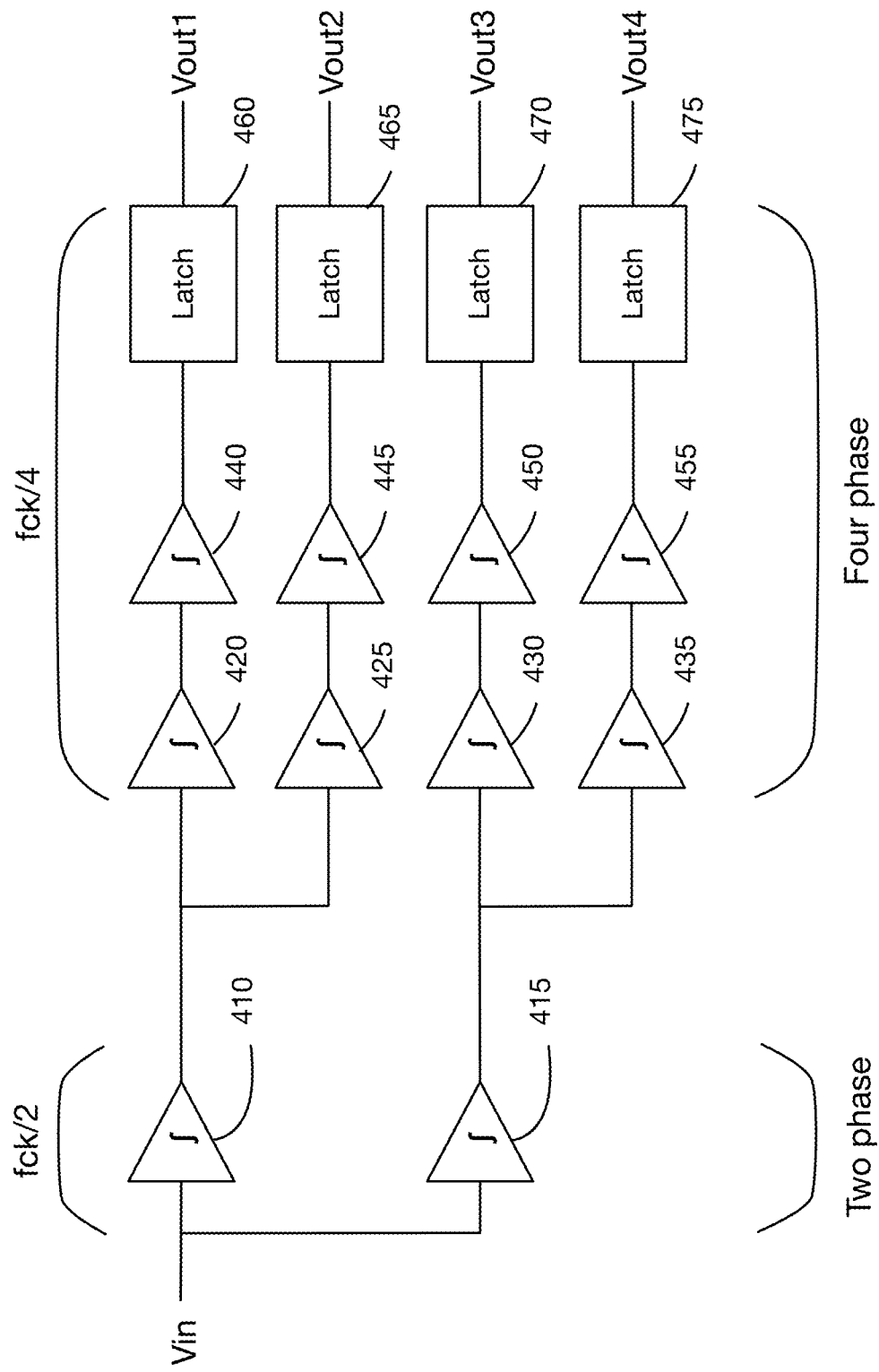
FIG. 4 is a block diagram showing a cascade of sampling integrator/amplifiers acting upon a single input signals and producing four results suitable for processing in four phases.

Clocked samplers with the described functionality are amenable to cascaded operation, as in the embodiment shown in the block diagram of FIG. 4. Input signal Vin is sampled at 410 and 415 by samplers operating on complementary phases of a two-phase sampling clock at frequency Fck/2. The resulting sampled results are each themselves sampled twice, by samplers operating on complementary phases of sampling clocks at frequency Fck/4. That is, each sampled result provided by 410 is alternately sampled by 420 or by 425 (as their sampling clock operates at one half the rate of the previous sample clock). Similarly, each sampled result provided by 415 is alternately sampled by 430 or by 435. The four results thus obtained are again sampled at 440, 445, 450, and 455, and those ultimate sampled results are digitally latched at 460, 465, 470, 475 to produce digital outputs Vout1, Vout2, Vout3, and Vout4. It should be further noted that the samplers described herein provide increased immunity to output loading, which my be particularly useful in embodiments such as FIG. 4 in which the signal is fanned out to multiple subsequent stages, as in the transition from two-phase to four-phase clock domains.

In practical embodiments, splitting data processing between two phase operation with its simple clocking regime, and four- (or greater) phase operation with its relaxed latency provides a useful tradeoff between power, speed, and complexity. Such cascaded samplers may be designed for any arbitrary number of resultant phases using known art clock division and/or clock steering logic, thus neither "two phase" nor "four phase" should be considered limiting in this description.

Figure 5:
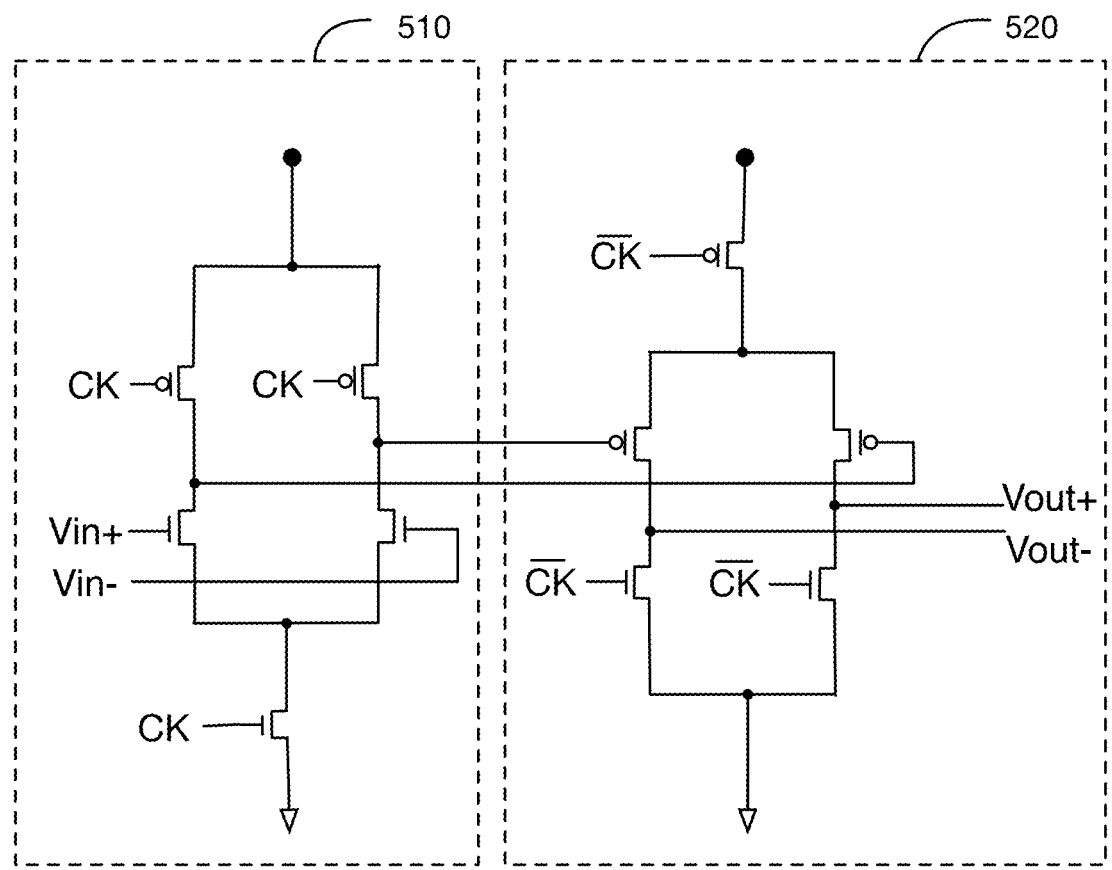
FIG. 5 is a schematic showing one embodiment of a dynamic mode CMOS self retimed integrator suitable for use as the samplers/integrators of FIG. 4.

FIG. 5 is a schematic diagram of one embodiment of a CMOS sampler/integrator particularly well suited to cascaded operation as in FIG. 4. Input clock CK and its compliment C'K control first sampler stage 510 and second sampler stage 520 respectively. In practice, this alternation of complementary stages provides an advantageous self-retiming behavior that simplifies clocking where there are two or more consecutive stages of such sampler/integrators. Such cascaded sampler architectures also allow significant gain to be obtained; in one embodiment, 27 dB of gain was obtained from a series of such stages with only 0.5 mV of RMS noise.

Decision Feedback Equalization

Decision Feedback Equalization or DFE is a well-known technique used to improve signal detection capabilities in serial communication systems. It presumes that the transmission line characteristics of the communications channel between transmitter and receiver is imperfect, thus energy associated with previously transmitted bits may remain in the channel (for example, as reflections from impedance perturbations) to negatively impact reception of subsequent bits. A receiver's DFE system processes each bit detected in a past unit interval (UI) through a simulation of the communications channel to produce an estimate of that bit's influence on a subsequent unit interval. That estimate, herein called the "DFE correction", may be subtracted from the received signal to compensate for the predicted inter-symbol interference. Practical DFE systems produce DFE corrections derived from multiple previous unit intervals.

At very high data rates, there may not be sufficient time to detect a received bit, calculate its associated DFE correction, and apply that correction to the next received unit interval in time to detect the next bit. Thus, some embodiments utilize so-called "unrolled DFE", where correction values are determined for some or all possible combinations of previous data values, those speculative corrections are applied to multiple copies of the received signal, and speculative detections made of the resulting corrected signal instances. When the earlier data values are finally resolved, the correct speculatively detected output may be chosen as the received data value for that unit interval.

As may be readily apparent, "unrolling" of DFE for even a modest number of historical unit intervals in this way requires a significant number of speculative results to be maintained effectively in parallel, introducing significant circuit complexity and associated power consumption.

Cascaded Samplers with DFE

Figure 7:
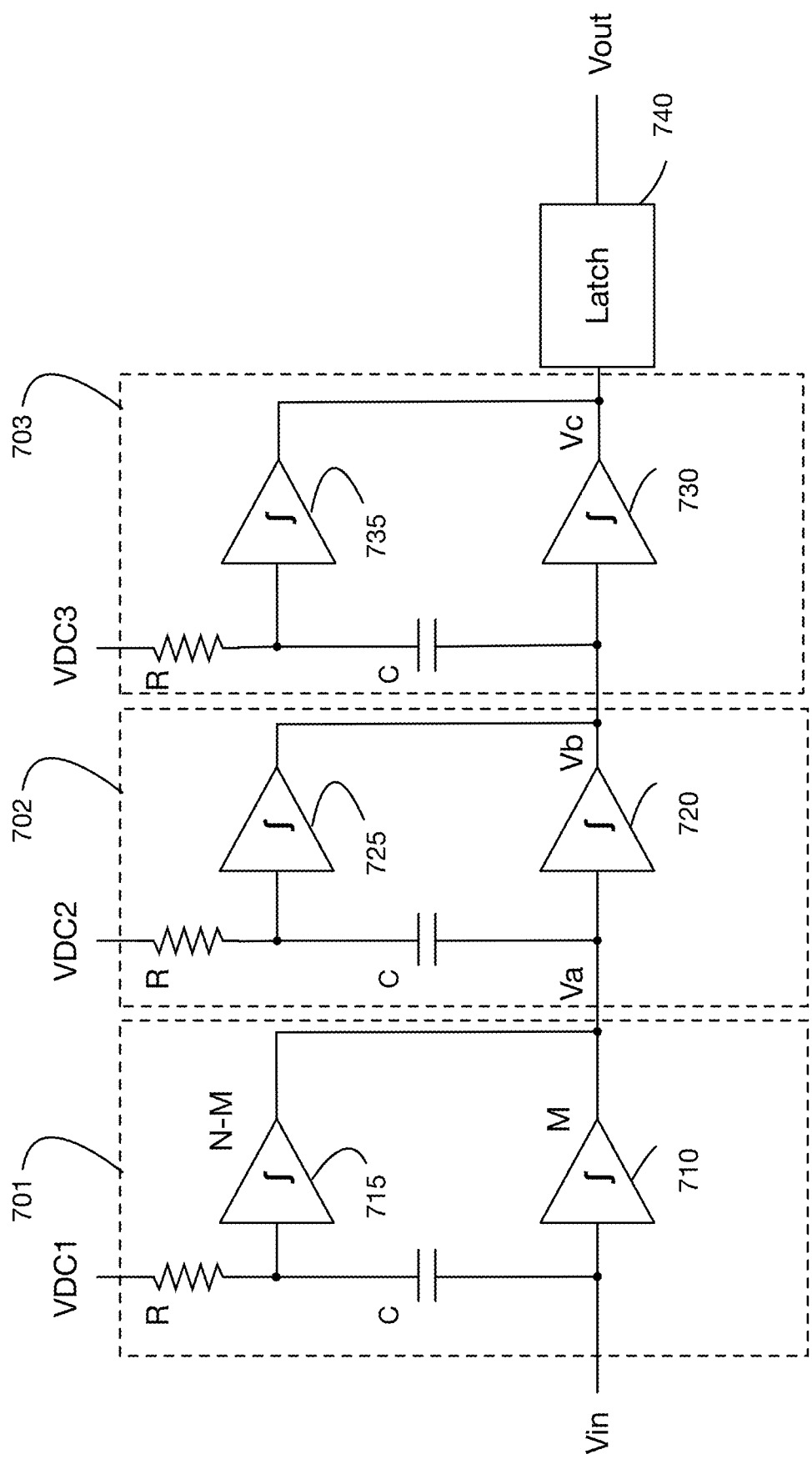
FIG. 7 illustrates one embodiment of a cascaded series of discrete time domain samplers providing increased wideband and high frequency gain with offset compensation.

The cascaded sampler embodiment of FIG. 7 provides an interesting alternative to unrolled DFE. As with previous examples, each primary Discrete Time Integration element (for example 710) is associated with a secondary Discrete Time Integration element (decision-feedback offset generator 715) providing offset compensation (DFE correction value VDC1) and boosted high frequency gain (determined by the time constant of RC.)

Figure 9:
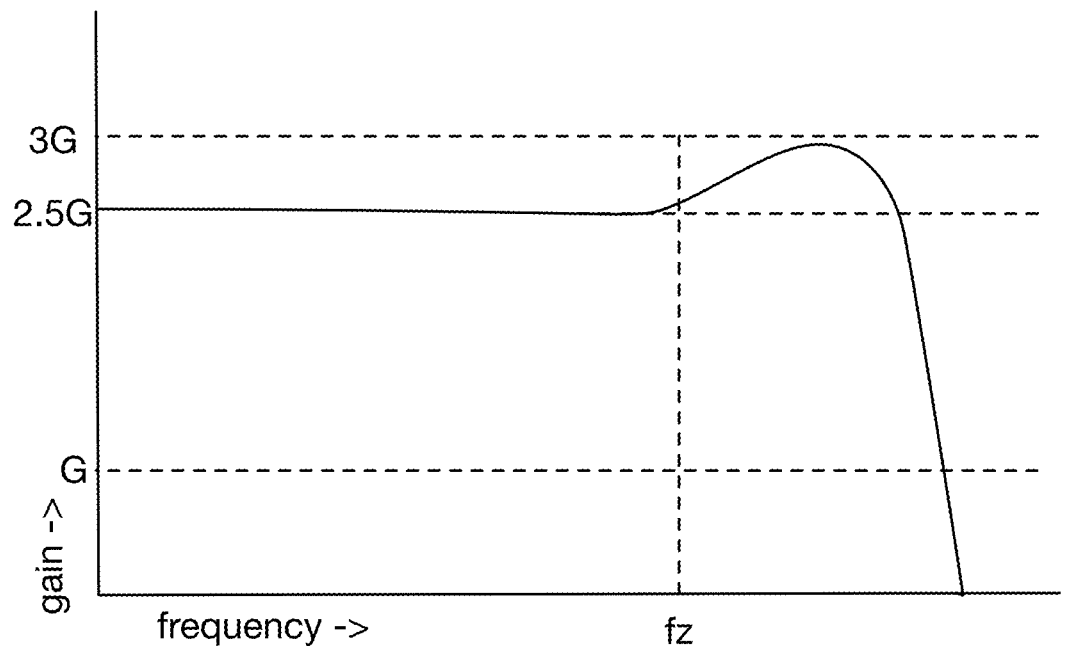
FIG. 9 is a frequency vs. gain plot for one cascaded sampler embodiment.

As the first stage composed of 710/715 is cascaded with the second stage of 720/725 and third stage of 730/735, significant signal gain is produced between input Vin and the ultimate data result sampled at Latch 740. The gain vs. frequency plot of one such embodiment is shown as FIG. 9, where "G" is the typical gain of a single stage composed of two Discrete Time Integration elements, each typically contributing a gain of approximately 0.5G.

Each Discrete Time Integration element 710, 715, 720, 725, 730, 735 in FIG. 7 may be as previously described as 210 of FIG. 2. In an alternative embodiment, alternating instances of FIG. 5's 510 and 520 may be used for consecutive stages of FIG. 7.

Figure 21:
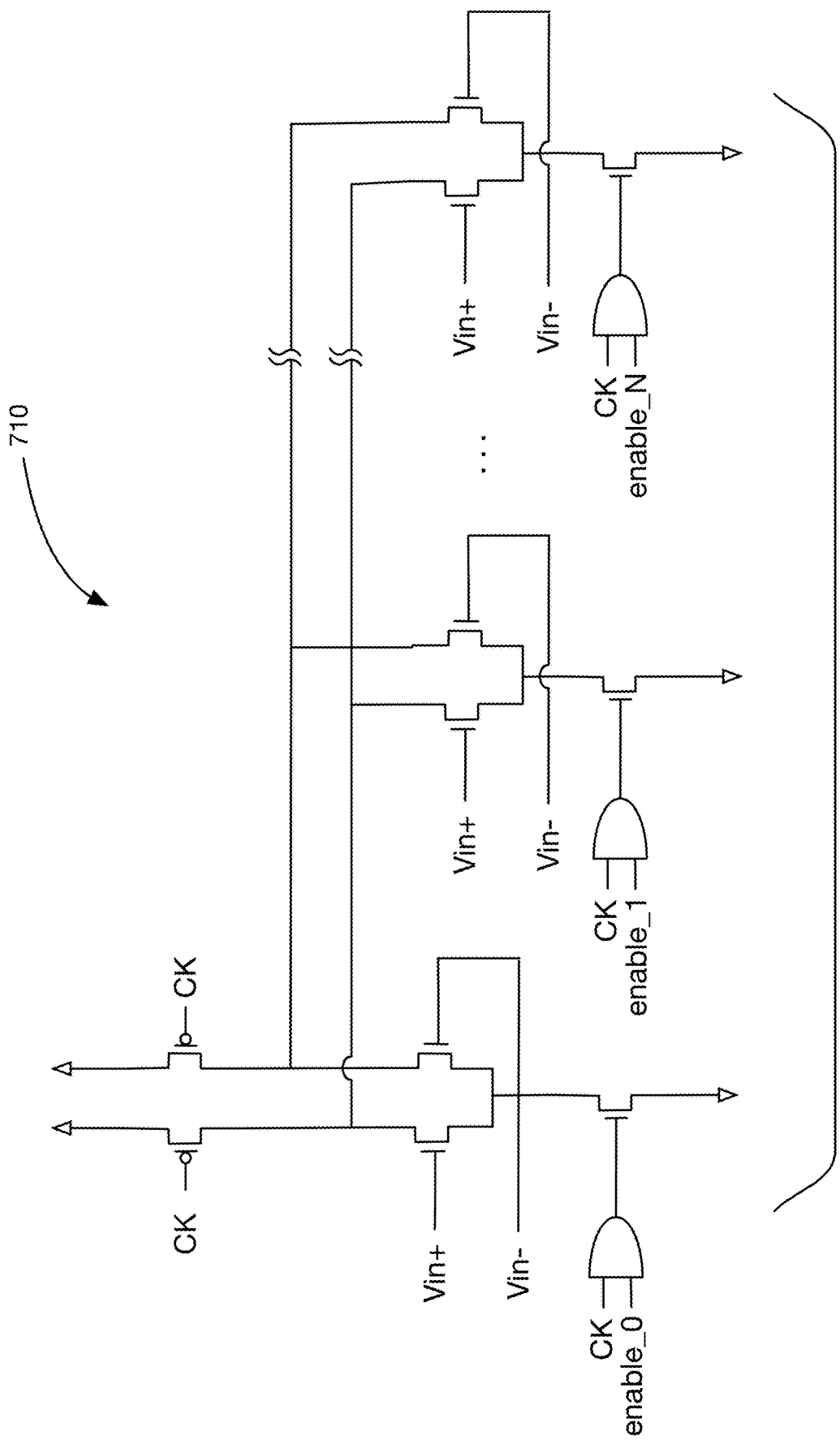
FIG. 21 is a schematic of a discrete time integrator (DTI) in accordance with some embodiments.

As shown in FIG. 7, each discrete time integration element may have an associated weight applied to it. FIG. 21 illustrates an exemplary discrete time integration (DTI) element, in accordance with some embodiments. As shown, the DTI element includes a single path for pre-charging the output nodes, and various paths for discharging current the output nodes. As shown, FIG. 21 includes N differential discharge pairs connected to the output nodes to discharge current. In some embodiments, each stage 701, 702, and 703 may enable a fixed number N of differential discharge pairs between the combination of both DTIs. Specifically, DTI 710 may have M enabled differential discharge pairs while DTI 715 has N-M enabled differential discharge pairs. Each DTI may have N available differential discharge pairs, each differential discharge pair being selectably enabled. By enabling additional differential discharge pairs, additional drive current discharges the corresponding output nodes faster while the capacitance added by enabling the additional discharge pairs does not add significantly more capacitance, providing an amplification in the output. Most of the capacitance at the output nodes may be the wire/trace capacitance, as well as parasitic capacitance of the pre-charge transistors. As shown in FIG. 21, each differential discharge pair may be enabled by a logic AND of the clock signal CK and a corresponding enable signal of a set of N enable signals. Such embodiments may be tuned to adjust the frequency characteristics of the cascaded sampler. As described above, DTIs 710, 720, and 730 are all-pass in that they pass high frequency and low frequency content while DTIs 715, 725, and 735 pass only high frequency content. Thus, high frequency peaking may be adjusting by switching more differential discharge pairs in DTI 715 on or off, while keeping N differential discharge pairs on altogether between the combination of DTI 710 and 715. It should be noted that further embodiments may enable a total greater than or less than N, depending on desired circuit operation.

Referring to FIG. 6A and as described above, the number of differential discharge pairs may be controlled to adjust the frequency response of the system. For example, turning on a larger amount of differential discharge pairs in a high-frequency DTI 715 will push the gain higher for frequencies above $$fz = \frac{1}{RC}.$$

As shown in FIG. 6A, the low-frequency response may have a gain of MxAunit, where Aunit is the gain for a single DTI 710, as only M all-pass differential discharge pairs are on. Further, the high-frequency response may have a gain of NxAunit, as all N units are passing high-frequency content. In some embodiments, for a single stage (e.g., stage 701), the gain for Va/Vin (or generally, Vout/Vin) may be represented as:

$$\frac{Vout}{Vin} = N \cdot H_{AP}(s) + (N-M) \cdot H_{HP}(s),$$

where the frequency of response for the All-Pass (AP) DTI 710 is represented as:

$$H_{AP}(s) = \frac{gm}{N \cdot I_{avg}} \cdot V_{sn} \cdot \frac{RC}{RC+1},$$

where gm is the transconductance of a unit slicer cell, $I_{avg}$ is the average bias current of a unit slicer cell during discharge phase, and $V_{sn}$ is the integrator output voltage swing. A similar calculation may be derived for the high-pass response HP(s) DTI 715.

Figure 8:
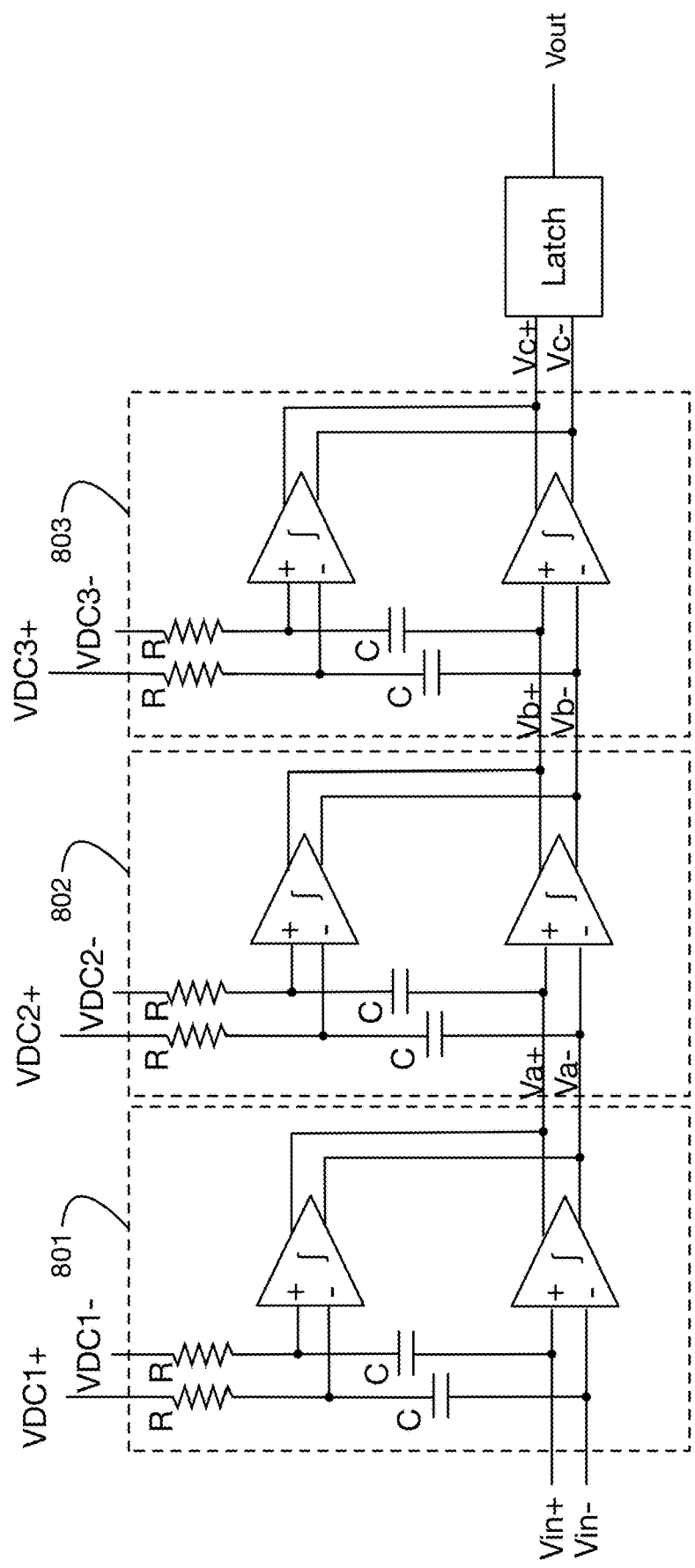
FIG. 8 illustrates a second embodiment of a cascaded series of discrete time domain samplers providing increased wideband and high frequency gain while supporting DC signal correction wherein each sampler stage has differential inputs and outputs.

As is well understood in the art, differential inputs as in the example Discrete Time Integration elements may be utilized as single-ended inputs by tying the unused second input to an appropriate source of DC bias and AC virtual ground. Alternatively, the fully differential embodiment of FIG. 8 may be used with either the elements of FIG. 2 or FIG. 5, all such variations being considered equivalent herein.

The DFE voltage magnitudes VDC1, VDC2, VDC3 of FIG. 7 (and for FIG. 8, their differential signal equivalents) may be used to correct fixed offset voltage errors or as inputs for DFE correction signals. In embodiments in which VDC1, VDC2, and VDC3 are used to inject DFE correction signals, the values of the correction signals may be determined according at least in part to what unit interval each DFE correction signal corresponds to, as well as the relative gain between each stage. For example, VDC1 may be injected at the first stage 701, and may undergo amplification due to the gains of stages 701, 702 and 703. Similarly, VDC2 applied in stage 702 may undergo amplification due to the gain of stages 702 and 703. In some embodiments, the DFE correction signal for the most recent unit interval (e.g., the immediately prior unit interval) may be applied at stage 703. In such embodiments, the DFE correction signal will have the highest resolution in terms of e.g., voltage amplitude, as it undergoes the least amplification. The DFE correction signal for the most recent unit interval is the most important correction signal for DFE, and thus a higher resolution for the most recent unit interval may be beneficial. Furthermore, DFE computation circuit 1150 in FIG. 11 may be configured to apply respective compensatory gains to each DFE correction signal based on which stage each DFE correction signal is presented to. For example, a DFE correction signal applied at VDC1 will undergo 3 amplifications, while a DFE correction signal applied at VDC2 will undergo 2 amplifications, and thus may have different compensatory gains determined by the DFE computation circuit.

It should be noted that as the cascaded series of Discrete Time Integrators passes along sampled voltage output values in consecutive clock intervals, it constitutes a form of analog signal memory or analog delay line. Thus, in the case where the voltage inputs are used for DFE correction, those inputs may take on the appropriate DFE correction value (i.e. associated with the proper historical data value) at or before the sampling time, that association being relative to the sampled signal being processed by that stage at that time. For the embodiment shown in FIG. 8 where the correction voltage inputs are differential, it was observed that DFE correction values may be expressed as differential voltage pair {VDCa, VDCb} if the historical bit was a '1', and by the swapped pair {VDCb, VDCa} if the historical bit was a '0'. Thus, the equivalent of a dual pole dual throw switch could be used to modify a single DFE voltage magnitude value VDC, directing either the original value or the swapped (reverse polarity) value into that stage of the system, controlled by the historic data bit associated with that previous time unit interval.

In one embodiment, the DFE magnitude values of {VDCa, VDCb} are chosen such that the resulting voltages (both directly and with the described differential swapping) satisfy both DFE correction criterion and normalize undesirable DC offset in the Discrete Time Integrator cascade. In some embodiments, the DFE magnitude values VDC may include a DC voltage offset component.

Figure 10:
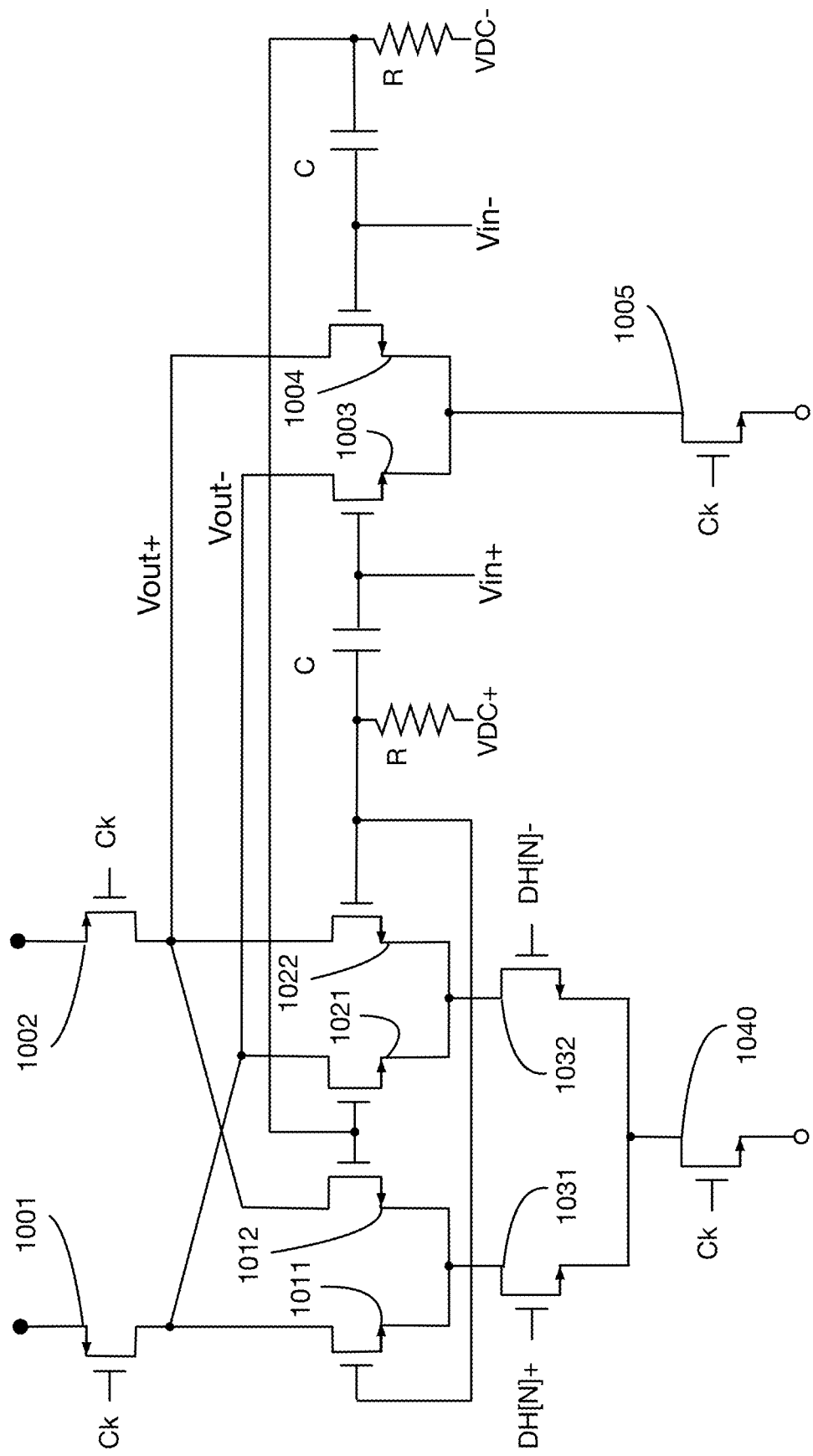
FIG. 10 is a schematic diagram of one embodiment of a sampler stage with increased high frequency gain and controllable-polarity offset compensation.

A further embodiment incorporates a modified Discrete Time Integrator embodiment as illustrated in FIG. 10. As with FIG. 8, all signals are differential. For avoidance of confusion, it should be noted that the schematic of FIG. 10 corresponds to one complete stage 801, 802, 803 of FIG. 8, comprising both Discrete Time Integrators, RC filter, etc., and adding a switching element to selectively swap a polarity of the DFE correction magnitude value under the control of a historical data input.

In this embodiment, the received analog input voltage Vin is sampled by transistors 1001, 1002, 1003, 1004, 1005 and augmented by high frequency peaking provided by filter networks RC and one of differential pairs 1011/1012 or 1021/1022 in the DFE offset generator and transistor 1040. The particular differential pair is selected by transistors 1031/1032 using historical data DH[N]+ and DH[N]−, the high frequency peaking result augmenting sampled analog voltage outputs Vout+ and Vout− with either a direct analog of the VDC+ and VDC− voltages, or their differentially swapped equivalent.

In some embodiments, an apparatus includes a memory device 1160 configured to store one or more historical data values, a Decision-Feedback Equalization (DFE) computation circuit 1150 configured to generate a DFE magnitude value, a decision-feedback offset generator (e.g., 1110, 1120, 1130) configured to receive the DFE magnitude value VDC and a historical data value DH[N] of the one or more historical data values, and to responsively generate an analog DFE correction value having a voltage magnitude equal to the DFE magnitude value and a polarity determined by the historical data value received from the memory device, and an analog sampler configured to receive an analog summation of the analog DFE correction value and an analog input signal Vin, and to generate a sampled voltage output Va according to a sampling clock Ck1. In the preceding embodiment, analog input signal Vin and sampled voltage output Va are with respect to decision-feedback offset generator 1110.

In some embodiments, the analog input signal is a sampled voltage output received from a cascaded analog sampler. In alternative embodiments, the analog input signal corresponds to an analog output of a multi-input comparator.

In some embodiments, the decision-feedback offset generator includes a pair of decision feedback branches 1011/1012 and 1021/1022, each decision feedback branch receiving the DFE magnitude value in respective inverse-polarity configurations, and a selection circuit 1031/1032 configured to receive the historical data value and to responsively enable one of the pair of decision feedback branches to determine the polarity of the DFE correction value. In some embodiments, the decision-feedback offset generator is further configured to receive a high-frequency injection of the analog input signal Vin. In some embodiments, the high-frequency injection of the analog input signal is received via a resistor-capacitor high-pass filter. In some embodiments, the decision-feedback offset generator is further configured to receive a voltage offset signal.

In some embodiments, the sampled voltage output has a propagation delay less than one unit-interval with respect to the received analog input signal. In alternative embodiments, the sampled voltage output has a propagation delay greater than one unit-interval with respect to the received analog input signal. In some embodiments, the memory device comprises a shift register.

Figure 11A:
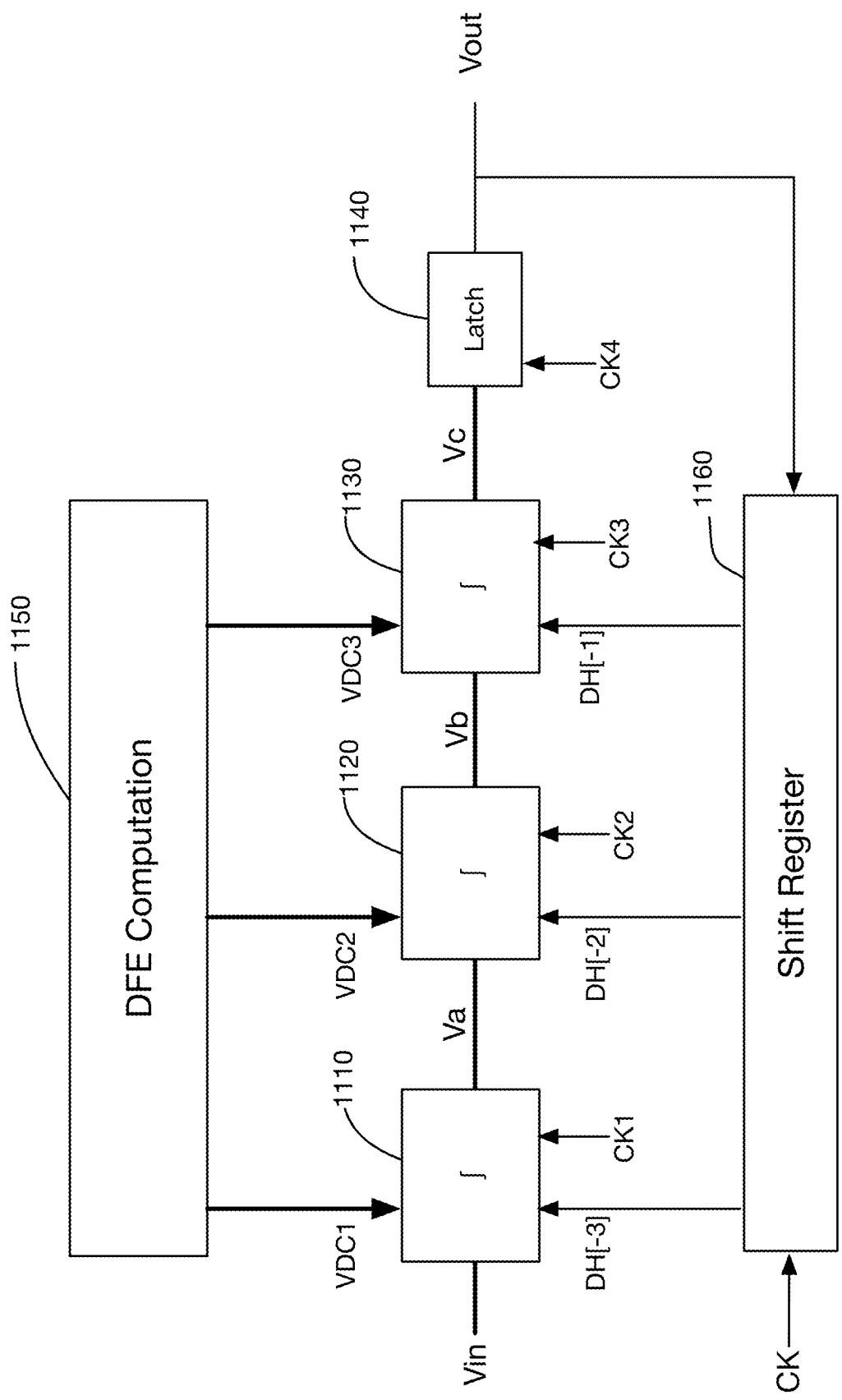
FIG. 11A is a block diagram of a cascaded system utilizing the sampler stages of FIG. 10.

The complete multistage embodiment shown in FIG. 11A utilizes three instances of FIG. 10 shown as 1110, 1120, 1130, and takes advantage of the analog delay characteristic of cascaded Discrete Time Integrators by configuring differential input VDC1 to be composed of the computed DFE correction for the [N−3] historical UI interval and DH[−3] the $3^{rd}$ previous data value, VDC2 to be composed of the computed DFE correction for the [N−2] historical UI interval and DH[−2] the $2^{nd}$ previous data value, and VDC3 to be composed of the computed DFE correction for the [N−1] (i.e. immediately preceding) historical UI interval and DH[−1] the immediately preceding data value (all such timing descriptions being relative to the current signal input Vin.) This provides the full duration of three unit intervals for the detection of a given data value, before that data value is required for use by the DFE system. As a non-limiting example, digital shift register 1160 is illustrated storing and providing the previous data values to stages 1130, 1120, and 1110 (i.e. in this illustration 1160 shifts to the left), each data value being sampled and detected by latch 1140, and also presented to data output Vout. DFE Computation 1150 is shown providing the previously-described DFE correction magnitude values VDC1, VDC2, VDC3, which represent the contribution of a given historical time unit interval to the observed perturbation of the current time unit interval's received signal. In some embodiments, VDC1, VDC2, and VDC3 may be represented as voltage magnitudes, whose polarity is determined by a historical data value. Each such voltage, combined with the polarity determined by selection information provided by the corresponding historical data bit for that historical time unit interval, produces a DFE correction value (also referred to herein as a DFE compensation value) appropriate to that processing stage's correction of the signal being sampled. As shown, each stage 1110-1130 receives a respective clock having respective delays. In some embodiments, the delay between any adjacent clock (CK1/CK2, CK2/CK3) may be on the order of 5-15 psec. Alternatively, each clock may have a fixed phase relationship such as a quadrature phase relationship generated by a local oscillator in a PLL. Such oscillators may take the form of ring oscillators, such as the ring oscillator 1180 shown in FIG. 11C.

Figure 13A:
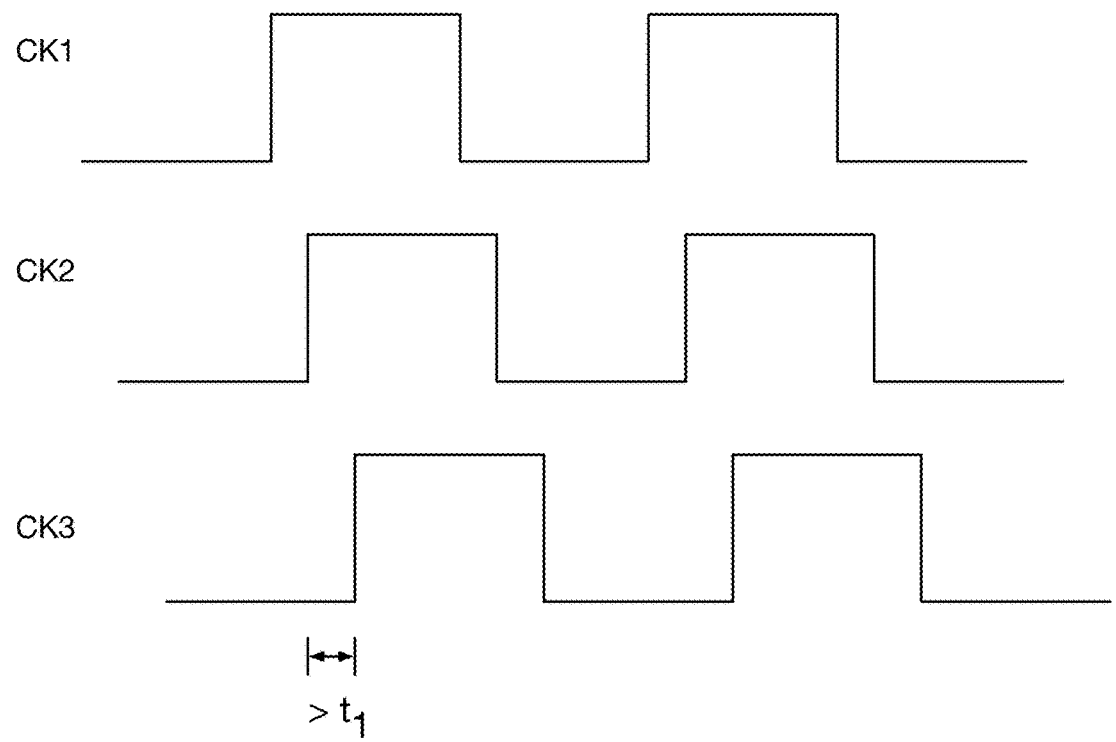
FIGS. 13A and 13B illustrate multi-stage sampling clock relationships, in accordance with some embodiments.
Figure 13B:
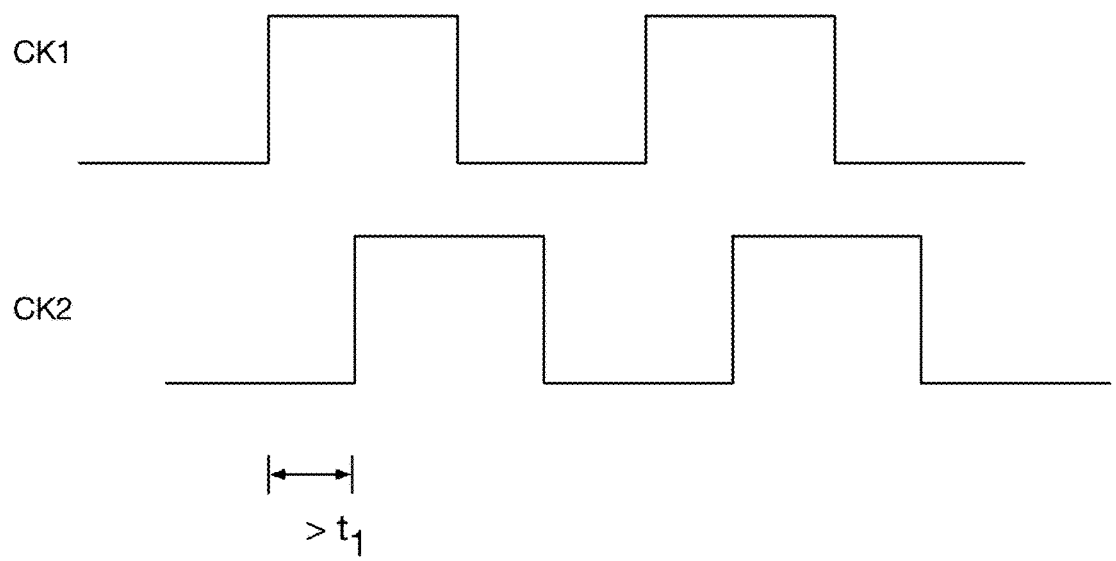
Figure 15A:
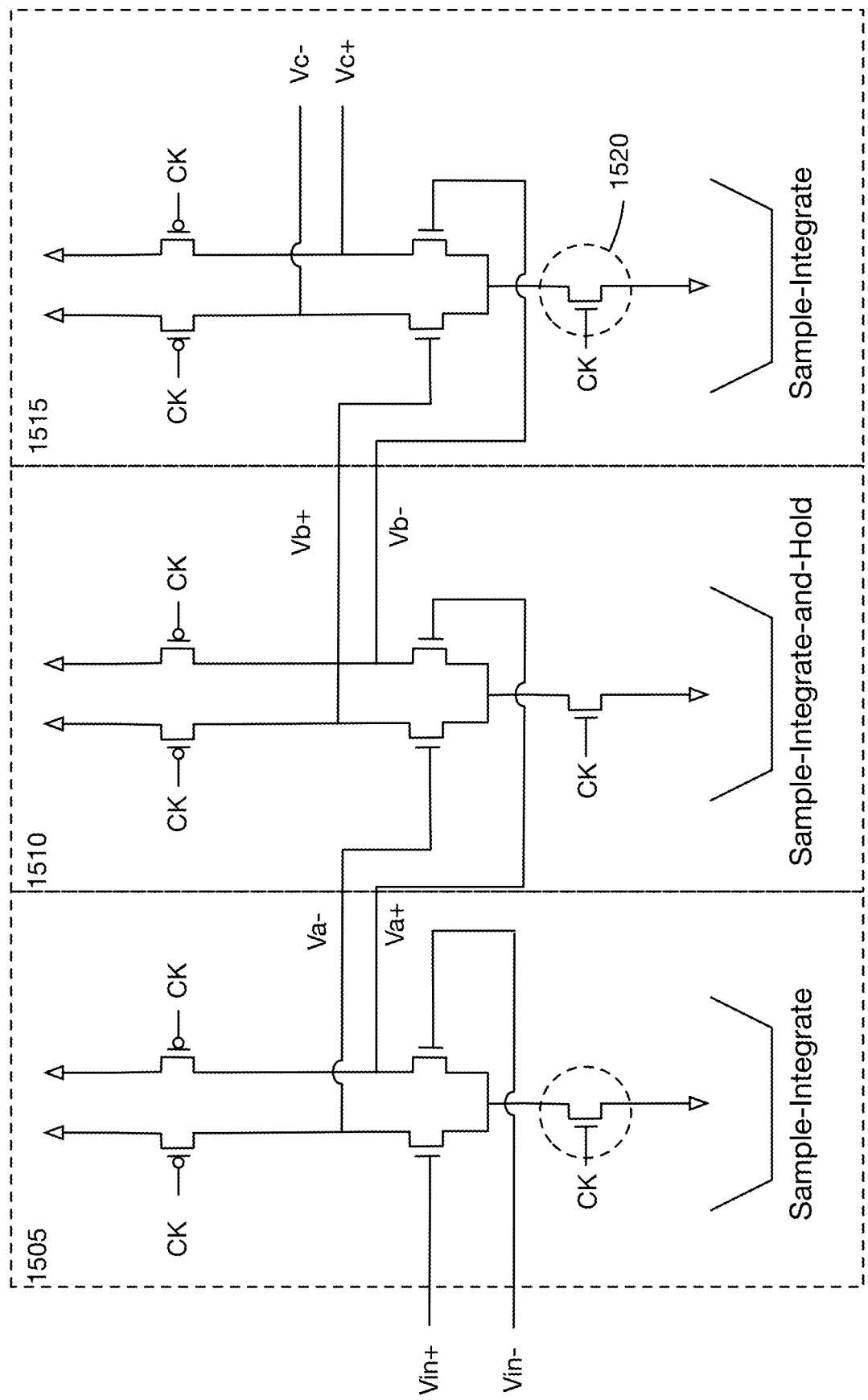
FIG. 15A is a schematic of a cascaded integrate-and-hold stage, in accordance with some embodiments.
Figure 15C:
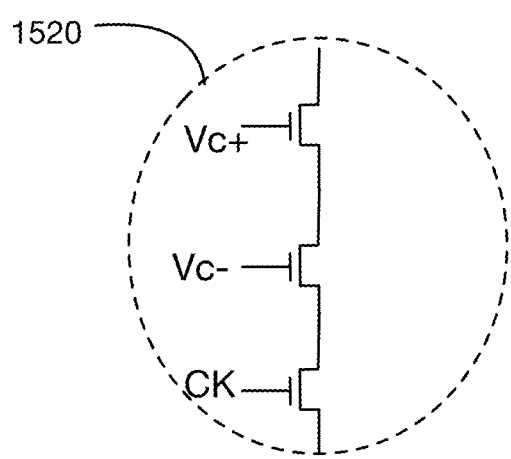
Figure 16A:
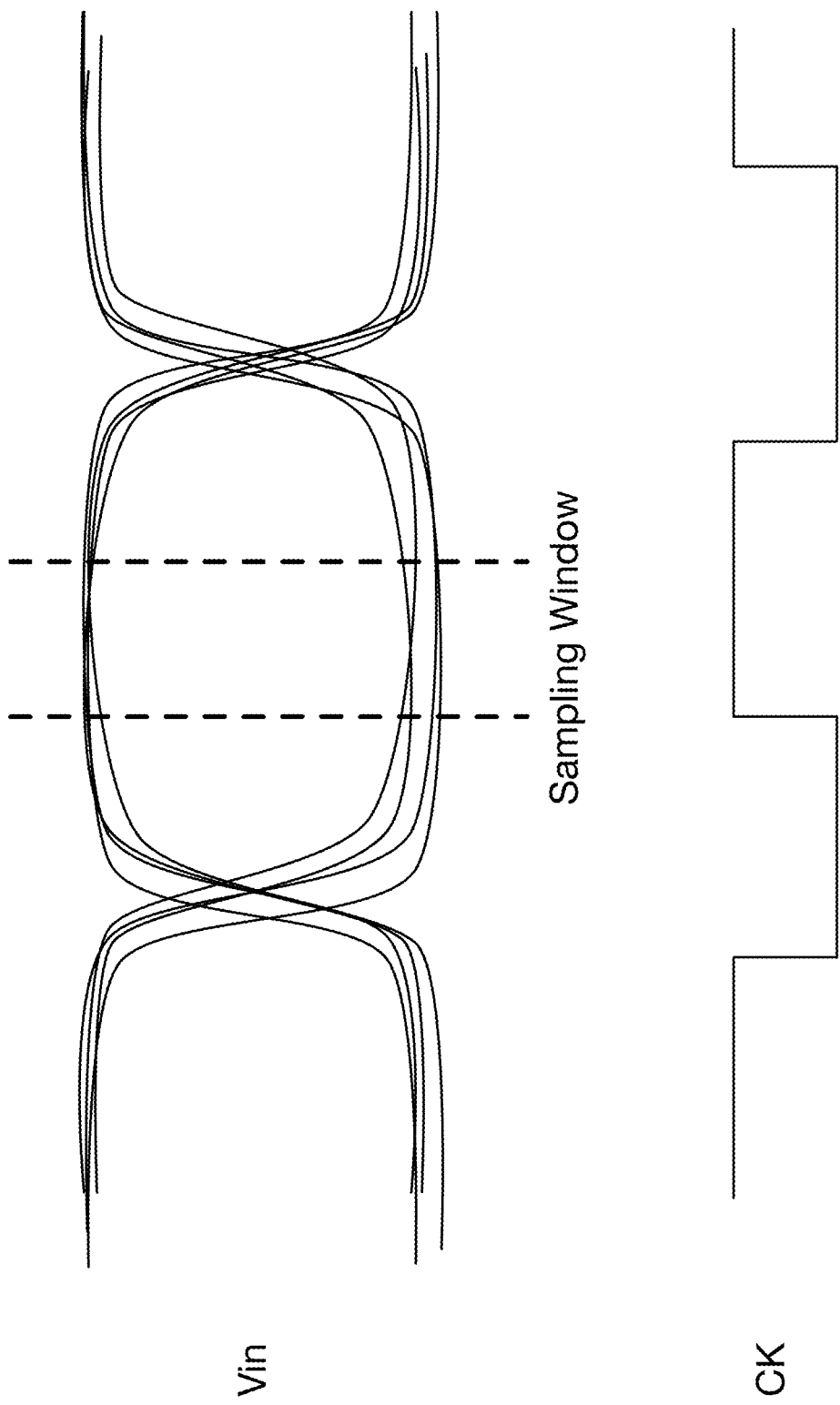
FIG. 16A illustrates a sampling window centered about the "center of eye" of a data signal, in accordance with some embodiments.
Figure 16B:
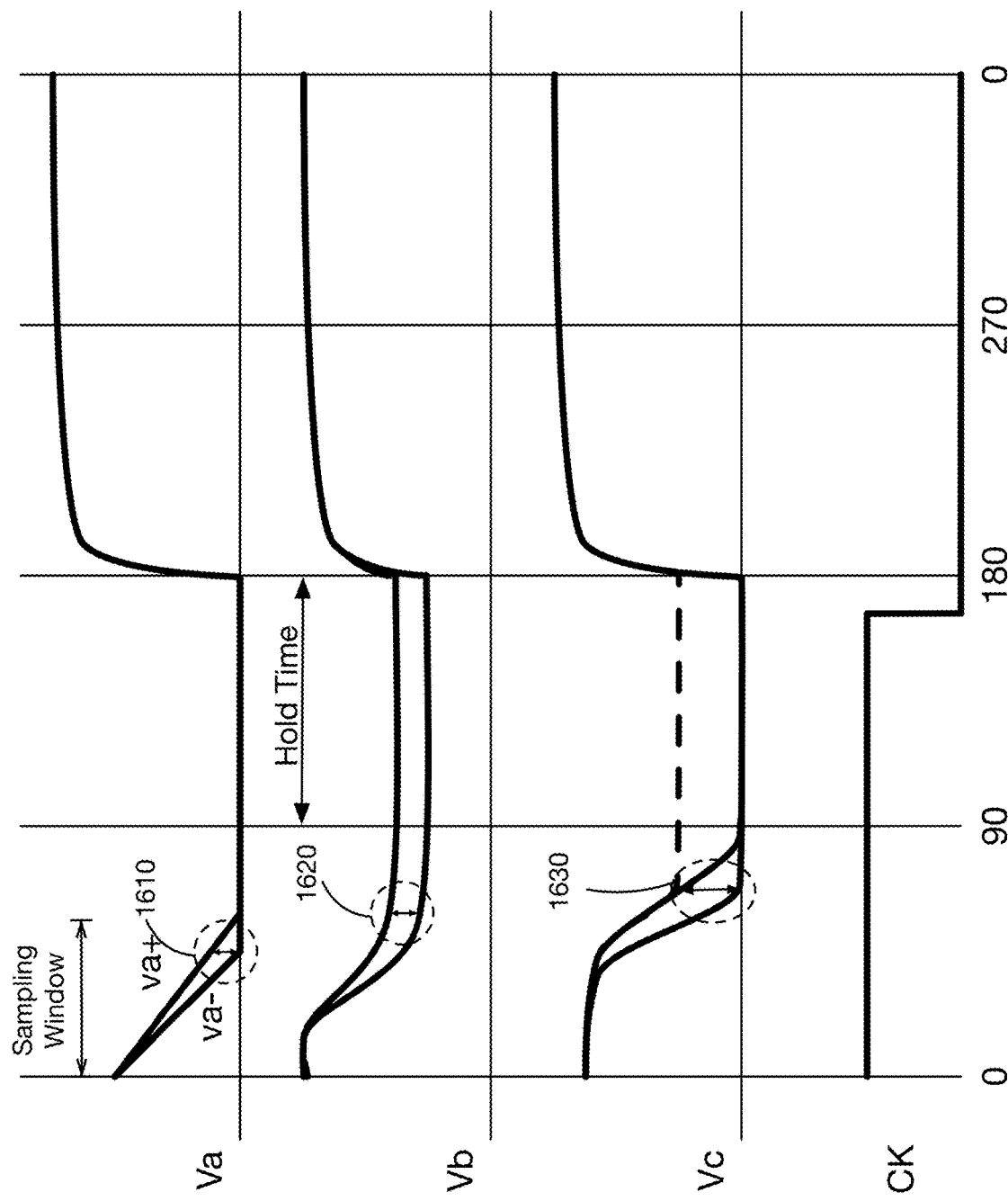
FIG. 16B is a timing diagram illustration discharging of pairs of nodes, in accordance with some embodiments.

FIG. 15A illustrates a multi-stage sampler including three cascaded sample-and-integrate circuits, in accordance with some embodiments. As shown, the middle stage provides an integrate-and-hold function. FIG. 15A may be explained in relation to the eye diagram of FIG. 16A and the waveforms shown in FIG. 16B. While the sampling clock CK is low, the output nodes of each stage may be pre-charged to a high voltage. When sampling clock CK goes high, the sampling window initiates and the CK-enabled NMOS transistors of each sampler turn on to begin discharging current from the corresponding output nodes. In some embodiments, each discrete time integrator may be clocked by a sampling clock having a delay with respect to the sampling clock of the previous stage, as illustrated in FIGS. 13A and 13B, and described in more detail below. The differential input voltage Vin is applied to transistors in the first stage 1505 of the cascaded integrate-and-hold circuit, and the first pair of nodes begin to discharge, creating first and second discharge control signals Va+ and Va−, as shown between 0 and 90 degrees for waveform Va in FIG. 16B. As shown, Vin may be an AC-coupled input, eliminating any common mode signal present. The levels of Vin± may be configured to control the transistors to operate in a linear region, and thus to produce voltage-dependent amounts of current through each transistor, rather than operating in a saturated region and turning the transistors on and off. As the transistors in 1505 operate in a linear mode of operation, the first and second discharge control signals Va+ and Va− decrease at different rates over a first time period according to the differential input voltage signal Vin. The first and second discharge control signals are used for selectively controlling a respective amount of discharge of an initial charge on each node of the pair of nodes in stage 1510 to generate a differential voltage Vb. For the purposes of the description below, the first time period may also be referred to as a sampling window. As shown in FIG. 16B, the first stage 1505 sets the sampling window corresponding to an integration of the input signal over the sampling window shown in FIG. 16A. Further details of the sampling window shown in FIG. 16A and how to control the sampling are given below in the description of FIG. 16A. The node connected to the transistor of the differential pair that has a higher input voltage from Vin will produce a discharge control signal Va+/Va− that decreases faster. As shown, a voltage difference between the first and second discharge control signals represents an integration of the input differential voltage Vin over the sampling window. A differential voltage Vb+/Vb− is generated on a pair of nodes in stage 1510 during the sampling window by selectively controlling a respective amount of discharge of an initial charge on the pair of nodes. As the first and second discharge control signals Va+/Va− fall below the operating threshold voltage of the differential transistors of the middle stage 1510, the pair of nodes of the middle stage stop discharging, and a differential voltage Vb is held for the duration of the sampling interval. In some embodiments as described above, the middle stage may initiate in response to a delayed sampling clock to prevent discharging immediately upon the non-delayed sampling clock initiates the sampling interval. As shown in FIG. 16B, the differential voltage on Vb is held for a subsequent time period, which may correspond to a remaining duration of the clock cycle, e.g., until sampling clock CK (or the delayed sampling clock) goes low again at or near 180 degrees, initiating recharging of the pair of nodes generating differential voltage Vb prior to the subsequent sampling interval. The differential voltage Vb may be held for use in pre-cursor compensation, as discussed below with respect to FIGS. 17 and 25. As illustrated by FIG. 16B, the differential voltage Vb being held above the threshold voltage of the transistors in the third stage allows the pair of output nodes providing voltage Vc to integrate the differential voltage Vb until the nodes Vc+ and Vc− fully discharge. In such embodiments, Vc may represent an amplified version of Vb, and may be present for at least a portion of the subsequent time period for which Vb is held. As shown in FIG. 16B, the cascaded integrate-and-hold circuit results in three amplification stages, illustrated by differential voltages 1610, 1620, and 1630 among Va+/Va−, Vb+/Vb−, and Vc+/Vc−, respectively. In some embodiments, a latch may be connected to the differential output voltage Vc, and whichever node discharges faster will force the output of the latch into a latched data output decision. An SR latch may be used in such a configuration, or alternatively other known types of latches. Alternatively, as described below and illustrated in FIG. 15C, the amplified differential voltage signal may be held for the subsequent duration if the corresponding current source 1520 is shut off in response to one of the output nodes falling below the threshold voltage of the transistor.

Figure 26:
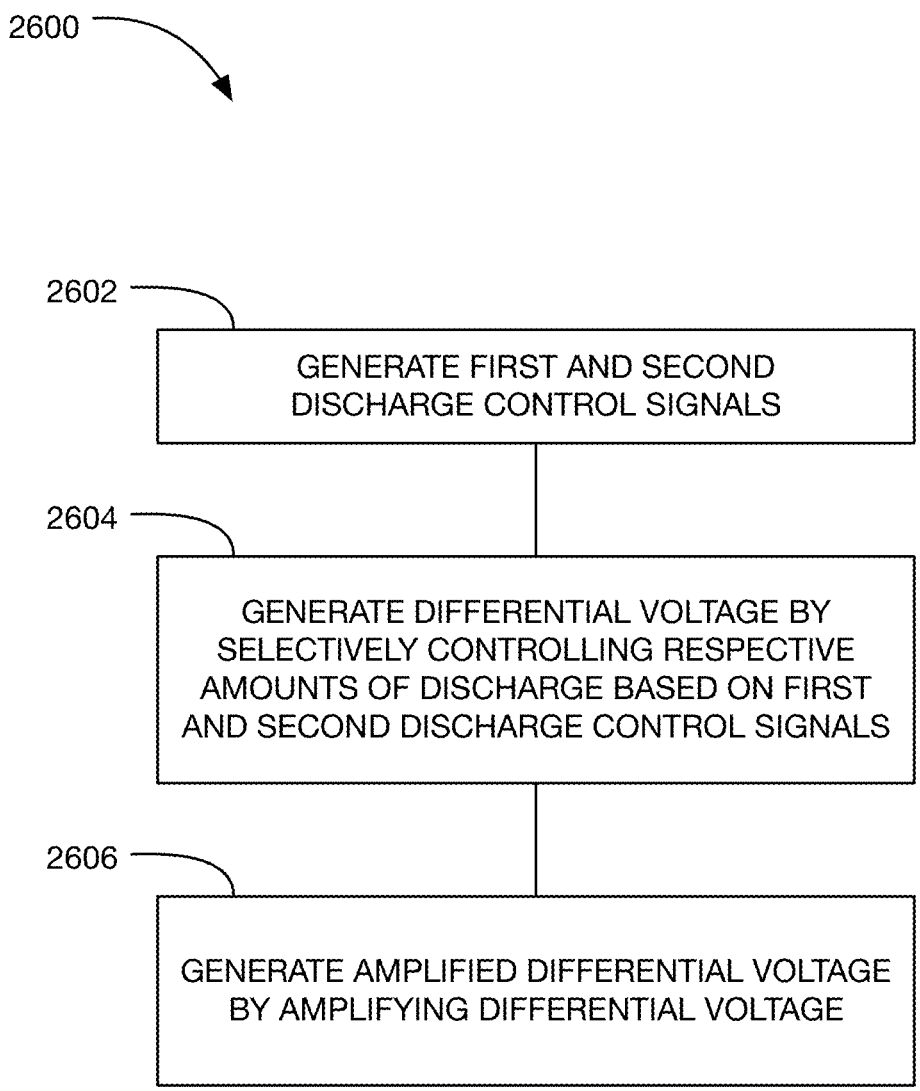
FIG. 26 is a flowchart of a method, in accordance with some embodiments.

FIG. 26 is a flowchart of a method 2600, in accordance with some embodiments. 1. As shown, method 2600 includes generating 2602 first and second discharge control signals Va+/Va− in response to a clock signal CK and (ii) an input voltage signal Vin, the first and second discharge control signals Va+/Va− decreasing at different rates to a threshold level during a first time period. A difference in rates is determined by the input voltage signal Vin. At step 2604, a differential voltage Vb is generated on a pair of nodes during the first time period by selectively controlling a respective amount of discharge of an initial charge on each node of the pair of nodes by applying the first and second discharge control signals Va+/Va− to respective transistors in a differential transistor pair connected to the pair of nodes, and maintaining the differential voltage Vb on the pair of nodes during a subsequent time period. At step 2606, an amplified differential voltage Vc is generated during at least a portion of the subsequent time period by amplifying the differential voltage Vb.

In some embodiments, generating the first and the second discharge control signals includes discharging a second pair of nodes via a second differential transistor pair, as shown in stage 1505 of FIG. 15A. In such embodiments, the rates of discharge of the first and second control signals may be controlled by a biasing current of a current source in stage 1505. In some embodiments, the rates of discharge of the first and second control signals are controlled by a supply voltage source connected to the transistors in stage 1505. In some embodiments, the rates of discharge of the first and second control signals are controlled by a load capacitance of the transistors in stage 1505.

In some embodiments, the method further includes applying a first decision feedback equalization (DFE) correction factor to the input voltage signal, a second DFE correction factor to the first and the second discharge control signals, and a third DFE correction factor to the differential voltage on the pair of nodes.

In some embodiments, the amplified differential voltage Vc is generated on a pair of output nodes having discharge amounts determined by the differential voltage Vb. In such embodiments, the amplified differential voltage is held during the subsequent time period in response to one of the pair of output nodes Vc+/Vc− falling below a threshold voltage, as shown by the OR operator of FIG. 15C.

In some embodiments, the method further includes generating a data decision output value based on the amplified differential voltage Vc. In some embodiments, the first time period is centered around a center-of-eye of the input voltage signal.

In some embodiments, the first stage of the cascaded sampler establishes a sampling window for which the later stages of the cascaded sampler (and eventually the latch at the output) look into the differential input voltage signal. FIG. 16A illustrates an exemplary "eye diagram" of such an input signal, in accordance with some embodiments. As shown in FIG. 16A, the sampling window may be initiated in response to the rising edge of the sampling clock (which may be aligned to be at or near the "center of eye"), and terminated e.g., by the discharge control signals Va+/Va− falling below operating threshold voltages of the differential transistors in the second stage, thus holding differential voltage Vb for the subsequent time period. In FIG. 16A, the rising edge of the sampling clock occurs slightly before the center of eye to establish a sampling window that is centered upon a center of eye of the input voltage signal. In some embodiments, a unit interval is approximately 30-45 picoseconds and the sampling window corresponds to a segment of approximately 10-15 picoseconds centered around the "center of eye", as shown in FIG. 16A. In some cases, if a sampling window is too long, the integration of the input signal may capture information that is not near the center of the eye. Alternatively, if the sampling window is too short, the integration only occurs over a very small portion of the input signal, and the output can be affected by noise. In some embodiments, the width of the sampling window is dependent on a biasing current of the first stage of transistors in stage 1505. By increasing the biasing current of the transistors, the first and second discharge control signals Va± will decrease faster, thus creating a narrower sampling window. Contrarily, by decreasing the biasing current, the discharge control signals will decrease slower, thus creating a wider sampling window. In some embodiments, adjusting one or more of a load capacitance and a supply voltage of stage 1505 will also adjust a width of the sampling window. By increasing the load capacitance and/or supply voltage, the width of the sampling window is increased, and vice versa. In the following equation:

$$t\_window = c\_parasitic * v\_dd / i\_bias$$

t_window corresponds to the duration of the sampling window, c_parasitic corresponds to the load capacitance of stage 1505, v_dd corresponds to the supply voltage, and i_bias corresponds to the bias current drawn through the parallel branches to discharge the nodes providing the first and second discharge control signals Va to the differential transistors in stage 1510.

In some embodiments, the sampling window is a center-of-eye sampling window, in which the sampling clock initiates discharging of the first pair of nodes prior to the "center of eye" and one or more of the first pair of nodes discharged as a time after the "center of eye." In some embodiments, the sampling window lasts approximately a third of a unit interval.

Figure 15B:
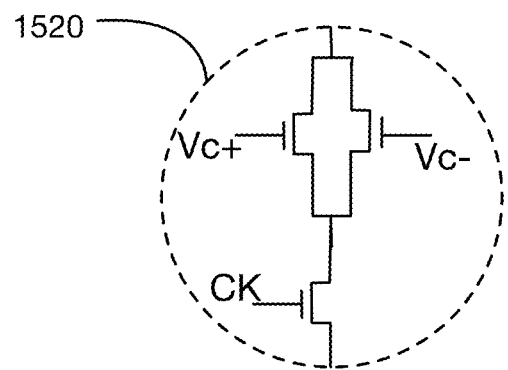
FIGS. 15B and 15C illustrate two configurations of termination pairs of transistors, in accordance with some embodiments.

In some embodiments, one or more of the first and third differential pairs of transistors may be configured to terminate discharging of the first and third pairs of output nodes, respectively. Such termination may be performed using termination pairs of transistors, for example inserted at 1520. FIGS. 15B and 15C illustrate two possible configurations of termination pairs 1520 of transistors. As shown, FIG. 15B includes parallel-connected termination pairs of transistors configured to terminate discharge of the third pair of nodes in response to both Vc+ and Vc− falling below the threshold voltage of the transistors (e.g., a logic AND operation). In FIG. 15C, 1520 illustrates a series-connected termination pair of transistors configured to terminate discharging of the third pair of nodes in response to the first of Vc+ and Vc− to fall below the termination voltage of the transistor (e.g., a logic OR operation). In an embodiment as in FIG. 15C, amplified differential voltage Vc may be held once one of the voltages Vc+ or Vc− falls below a threshold voltage, shutting off the corresponding current source and halting the discharge of both nodes. Such a scenario is illustrated by the dashed line in the waveform of Vc in FIG. 16B.

In some embodiments, each stage may be clocked with the same clock signal as illustrated in FIG. 15A, however alternative embodiments may utilize slightly delayed sampling clocks for each subsequent stage, such as clocks having relationships illustrated in FIGS. 13A and 13B. By introducing delays into the sampling clock to generate first and second delayed sampling clocks, the discharging of each subsequent stage may be delayed, as illustrated by the waveforms of FIG. 16B. Alternatively, the nodes Vb and Vc may begin discharging immediately when CK goes high, and integration begins as the differential voltage inputs from the previous stages Va and Vb separate, respectively.

Figure 18A:
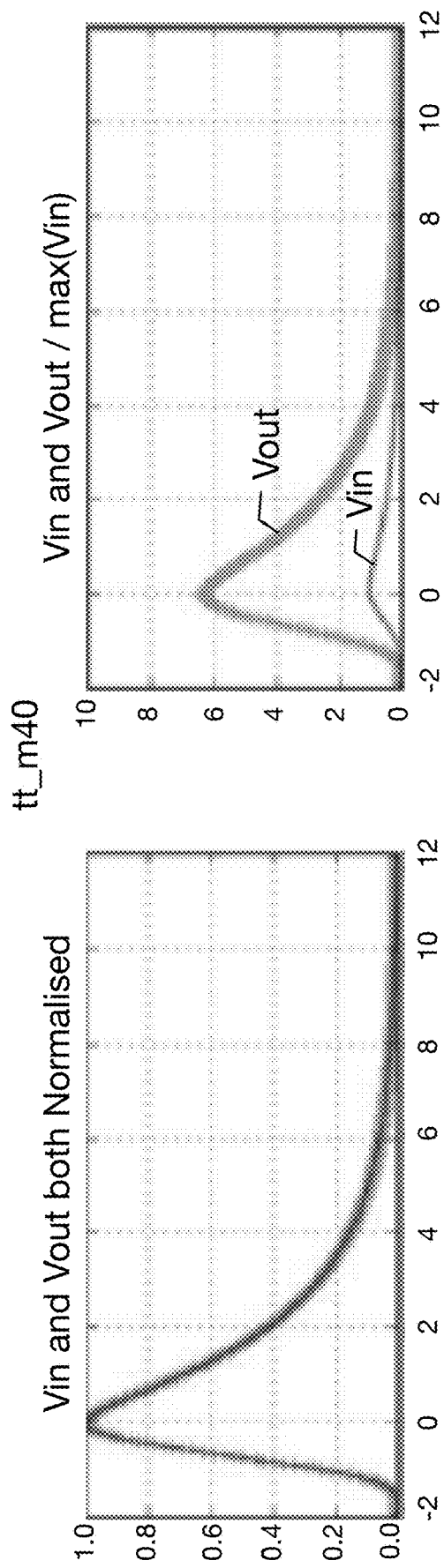
FIGS. 18A-18C illustrate gain simulations of a cascaded integrate-and-hold circuit for typical-typical (tt) corners, fast-fast (ff) corners, and slow-slow (ss) corners, respectively in accordance with some embodiments.
Figure 18A:
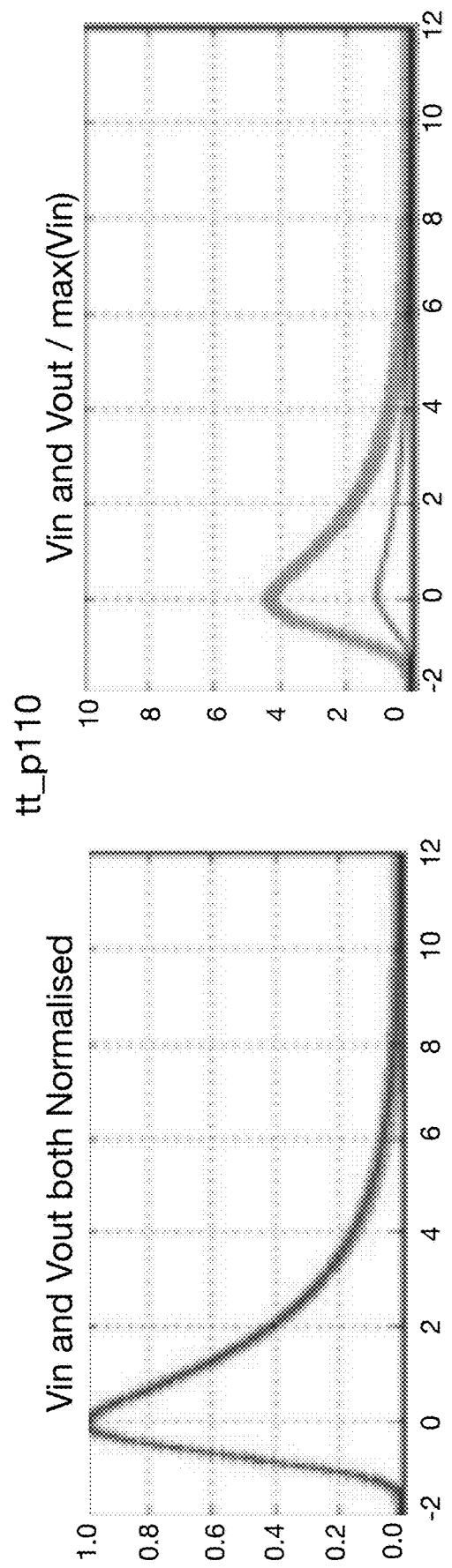
Figure 18B:
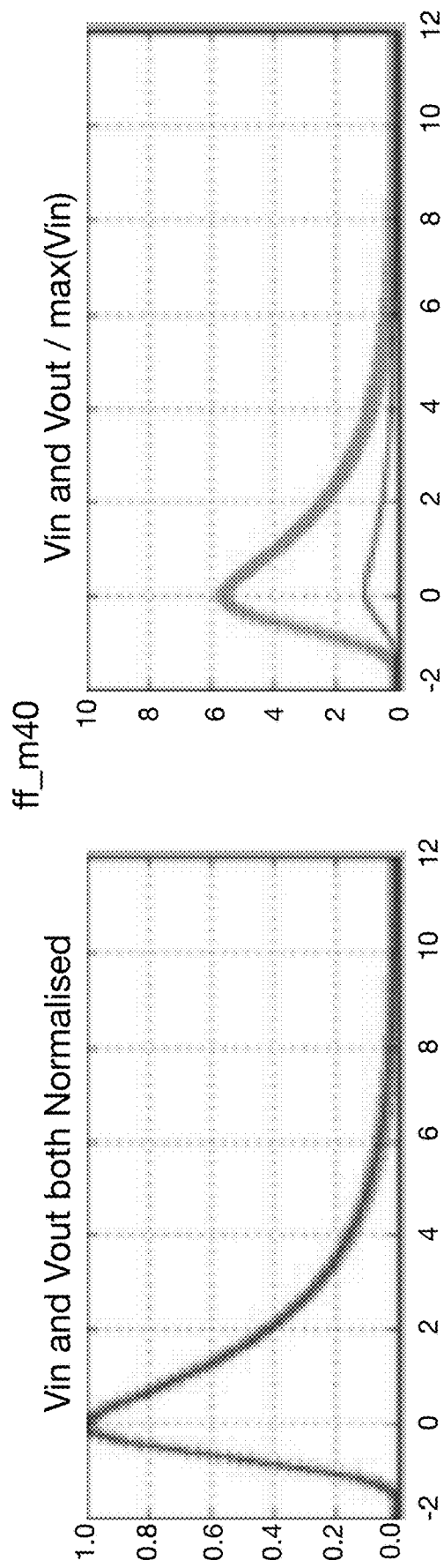
Figure 18B:
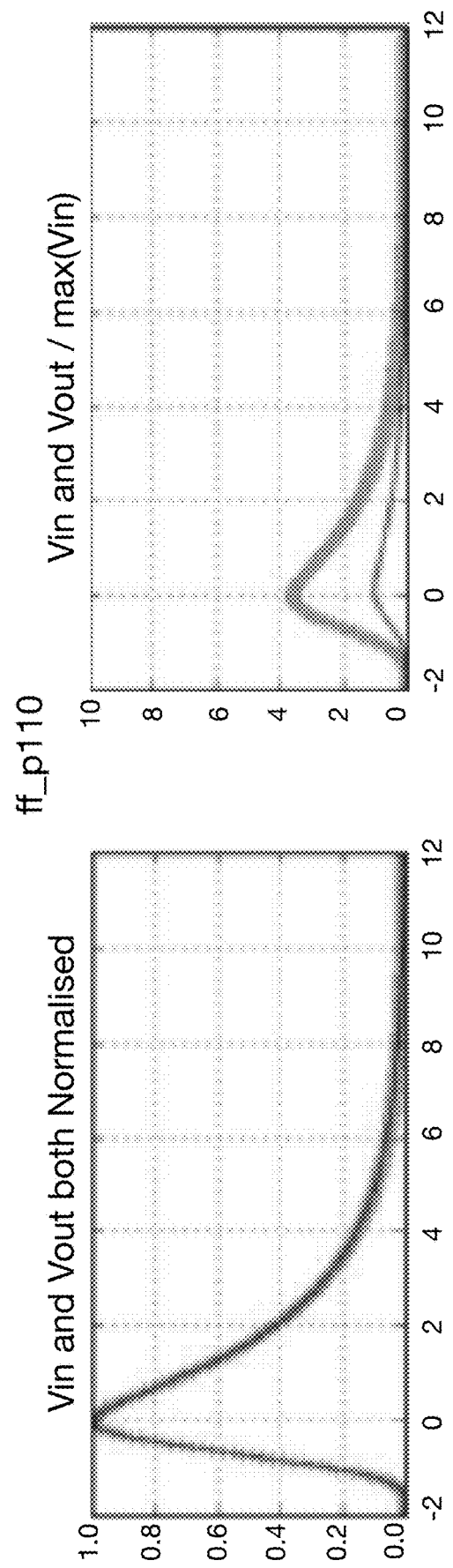
Figure 18C:
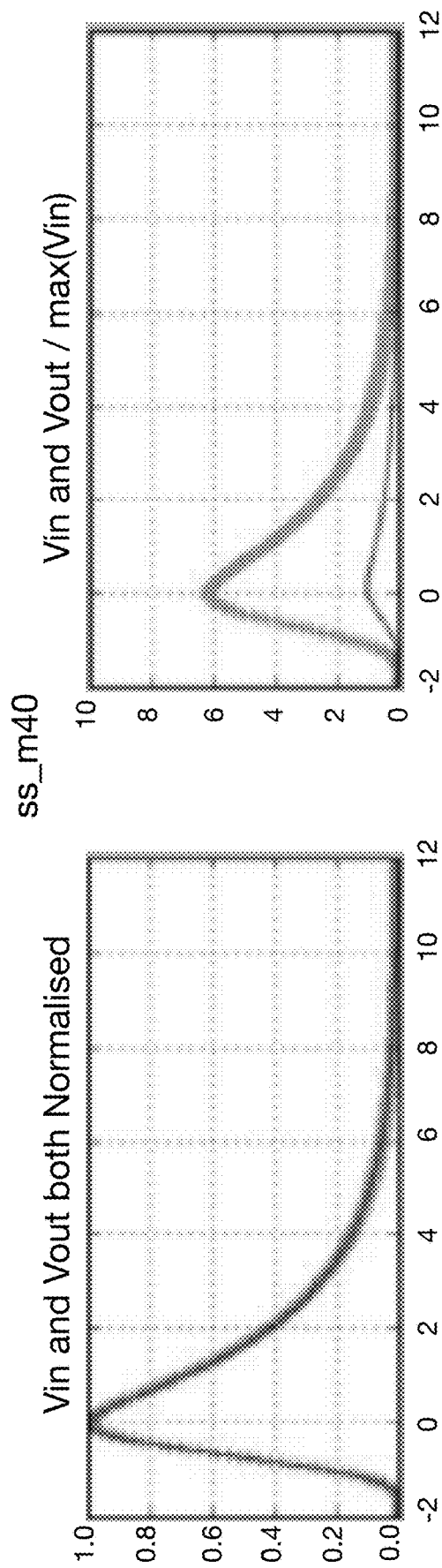
Figure 18C:
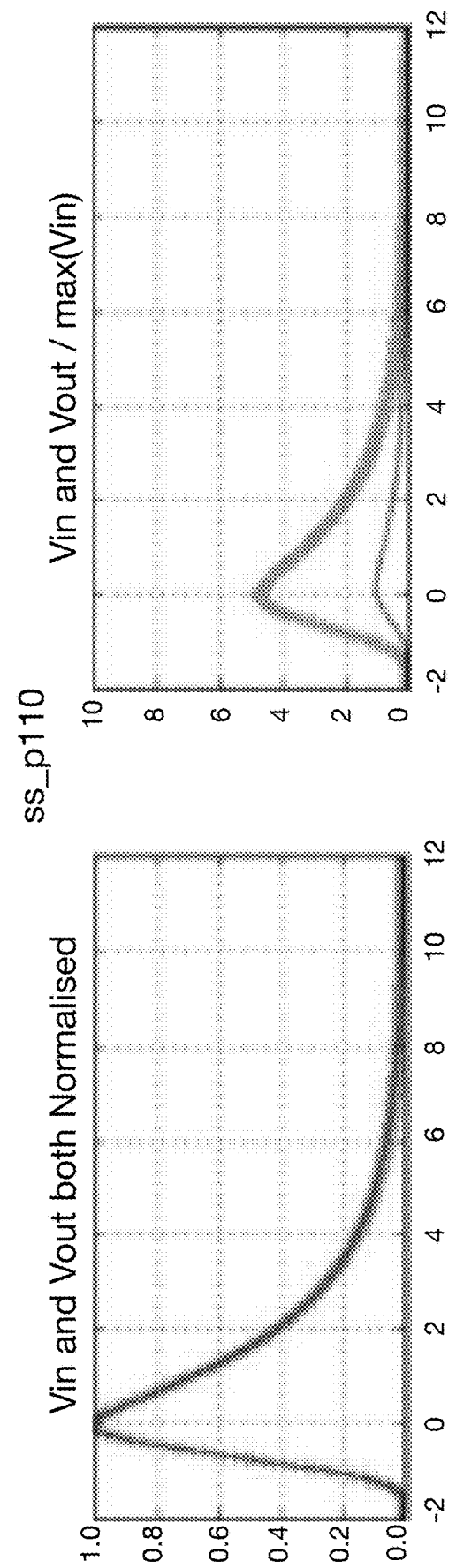

FIGS. 18A, 18B, and 18C illustrate various gain measurements of a multi-stage sampler in accordance with some embodiments. The graphs in the right-hand columns if FIGS. 18A-18C illustrate that a linear gain is achieved for Vin for various simulation parameters. Specifically, from top to bottom, gains of approximately 6V/V and 4V/V are achieved in FIG. 18A, 6V/V and 4V/V are achieved in FIG. 18B, and 6V/V and 5V/V are achieved in FIG. 18C. the graphs in the left-hand columns of FIGS. 18A-18C illustrate the waveforms of Vin and Vout after being normalized. In the left-hand column, the input Vin is scaled by a linear gain value and the waveforms are lined up on top of each other, indicating a linear gain across the frequency band. In FIGS. 18A-18C, simulations are performed for typical-typical (tt), fast-fast (ff) and slow-slow (ss) process corners, as known to those of skill in the art. Further, two simulations were performed using different process variation for each corner, denoted m40 and p110.

Figure 19A:
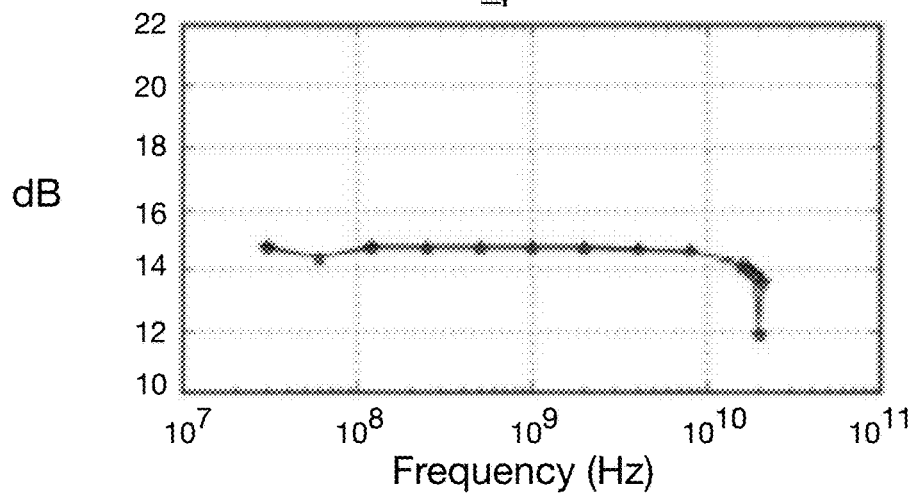
FIGS. 19A and 19B illustrate frequency response spectrums for the simulations of FIGS. 18A-18C, in accordance with some embodiments.
Figure 19A:
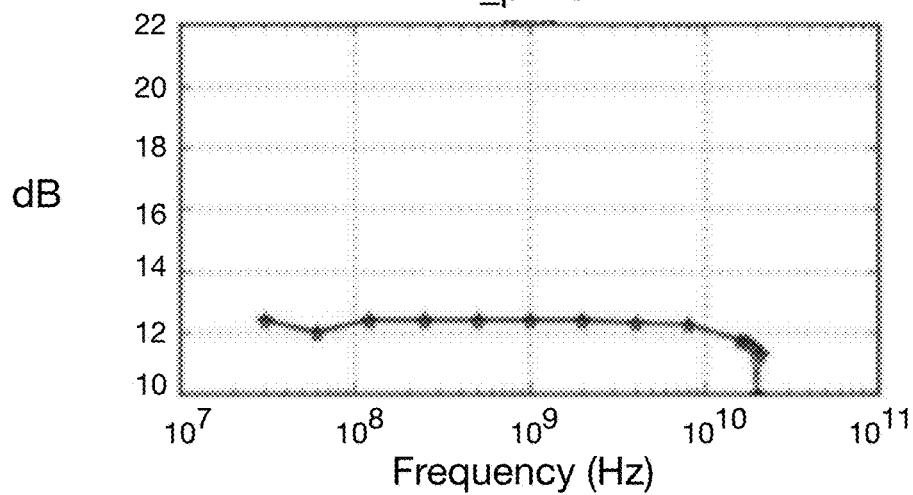
Figure 19A:
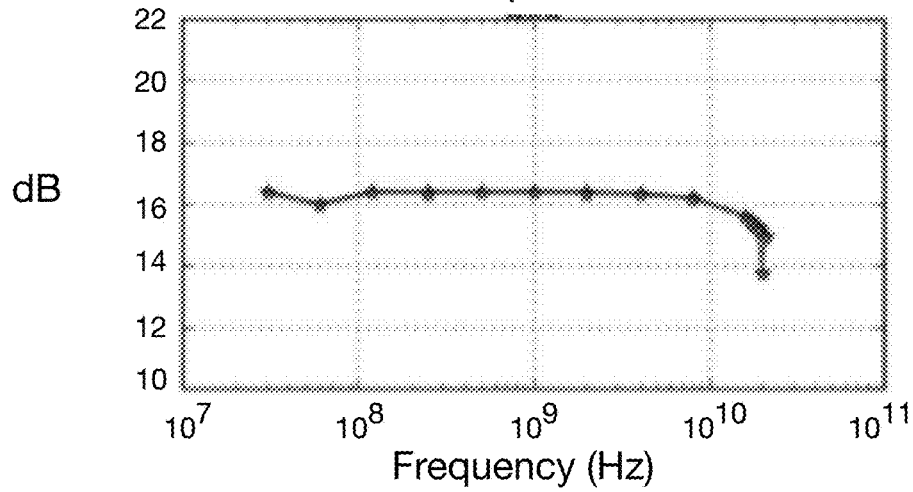
Figure 19B:
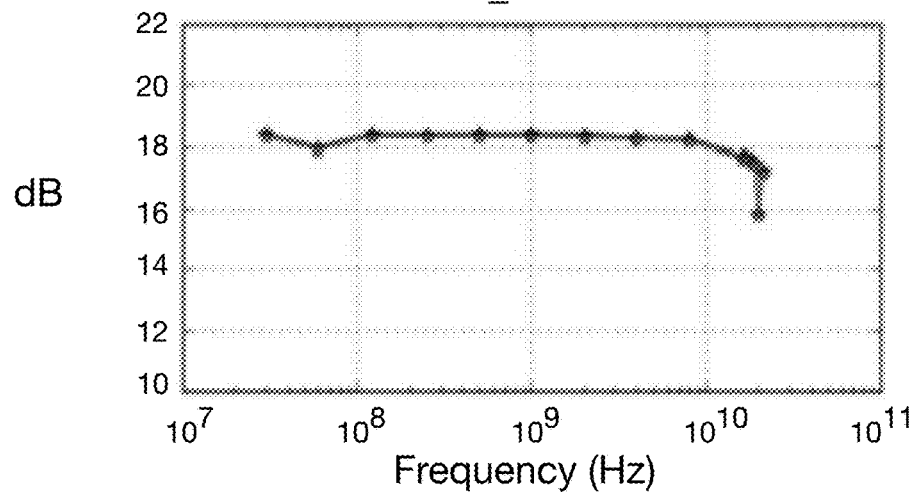
Figure 19B:
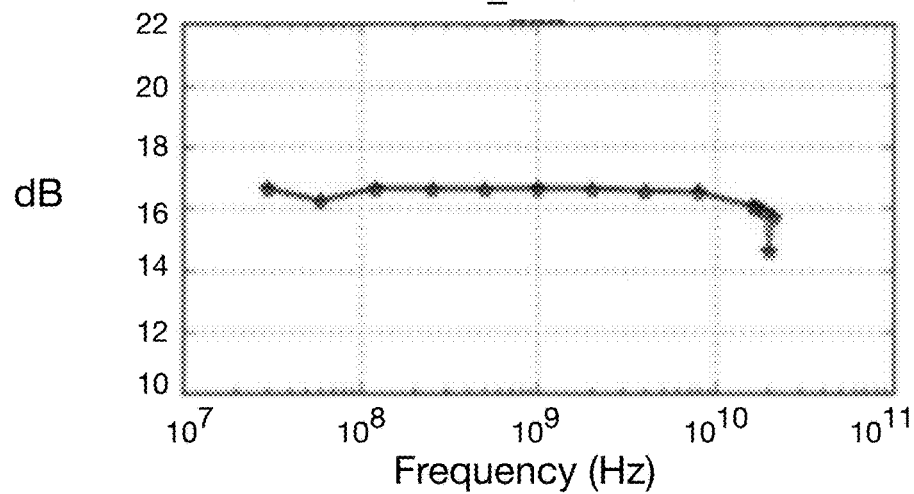
Figure 19B:
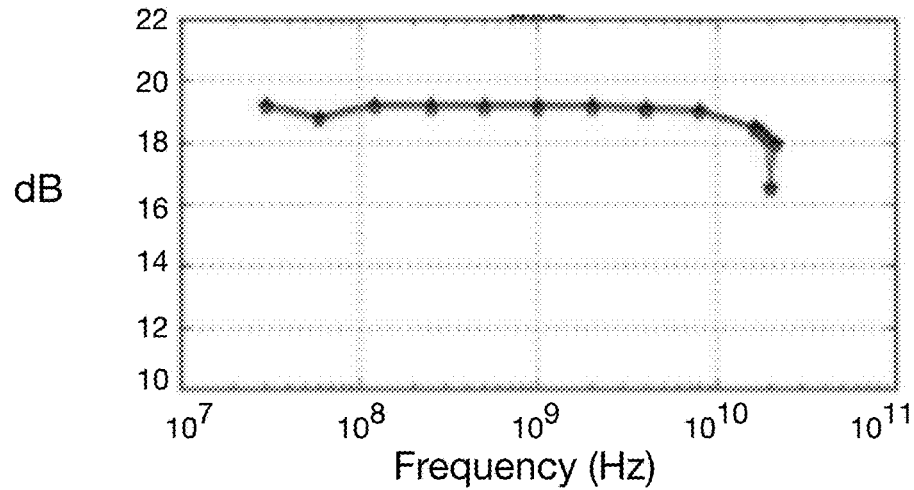
Figure 20A:
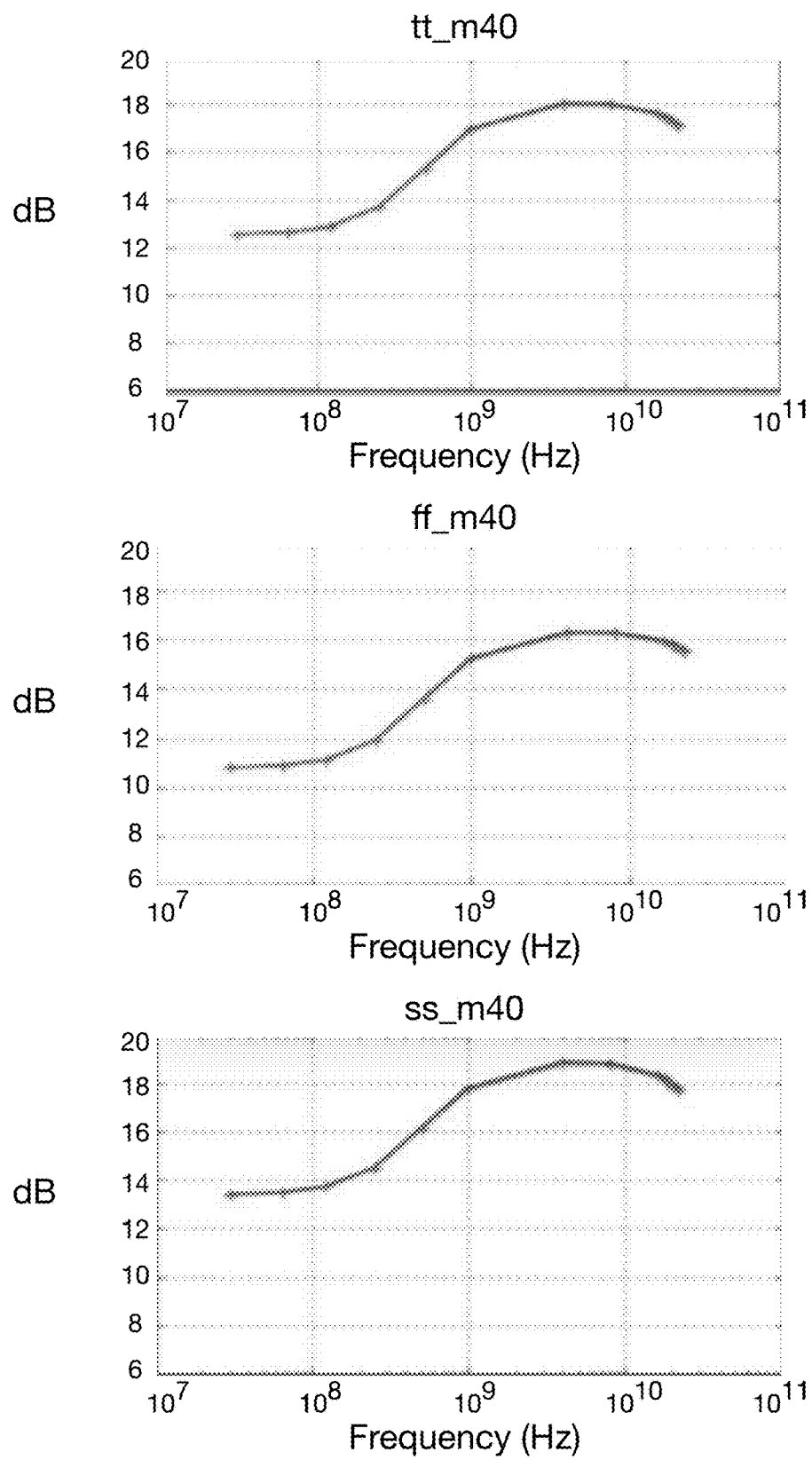
FIGS. 20A and 20B illustrate frequency response spectrums of a cascaded integrate-and-hold circuit having a capacitor coupled to the input, in accordance with some embodiments.
Figure 20B:
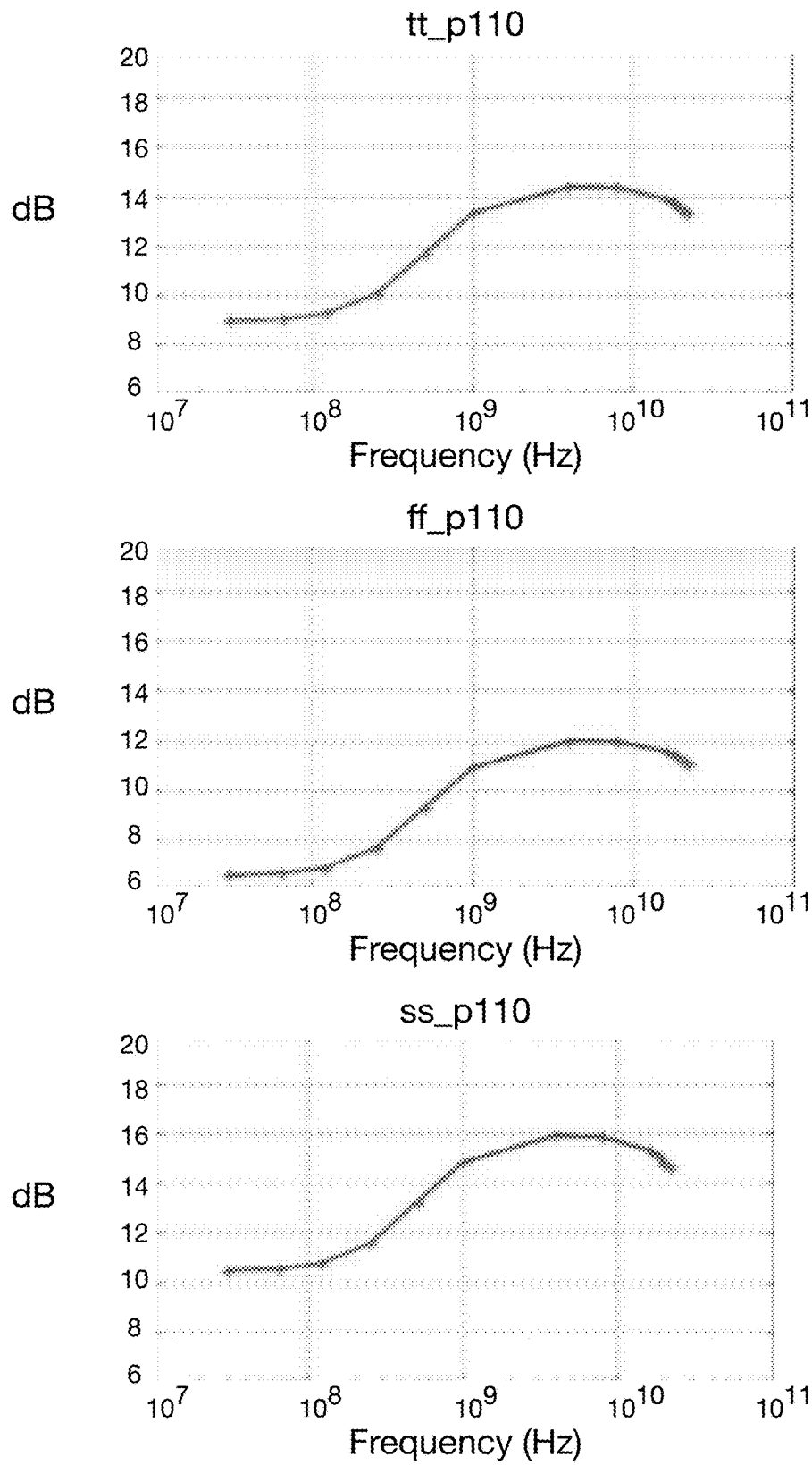

FIGS. 19A and 19B illustrate various frequency response spectrums for the above simulations of the cascaded integrate-and-hold circuit over a frequency band of 30 MHz-21 GHz. As shown, the frequency responses are very flat across the bands. Further, process variation such as temperature variation does not influence the linearity of the frequency response. FIGS. 20A and 20B are similar diagrams illustrating the linearity of the frequency response among different process variations, however the systems used to generate the spectrums of FIGS. 20A and 20B have a capacitor coupled to the input acting as a high-pass filter, while the systems of FIGS. 19A and 19B do not have a capacitor coupled to the input.

Figure 17:
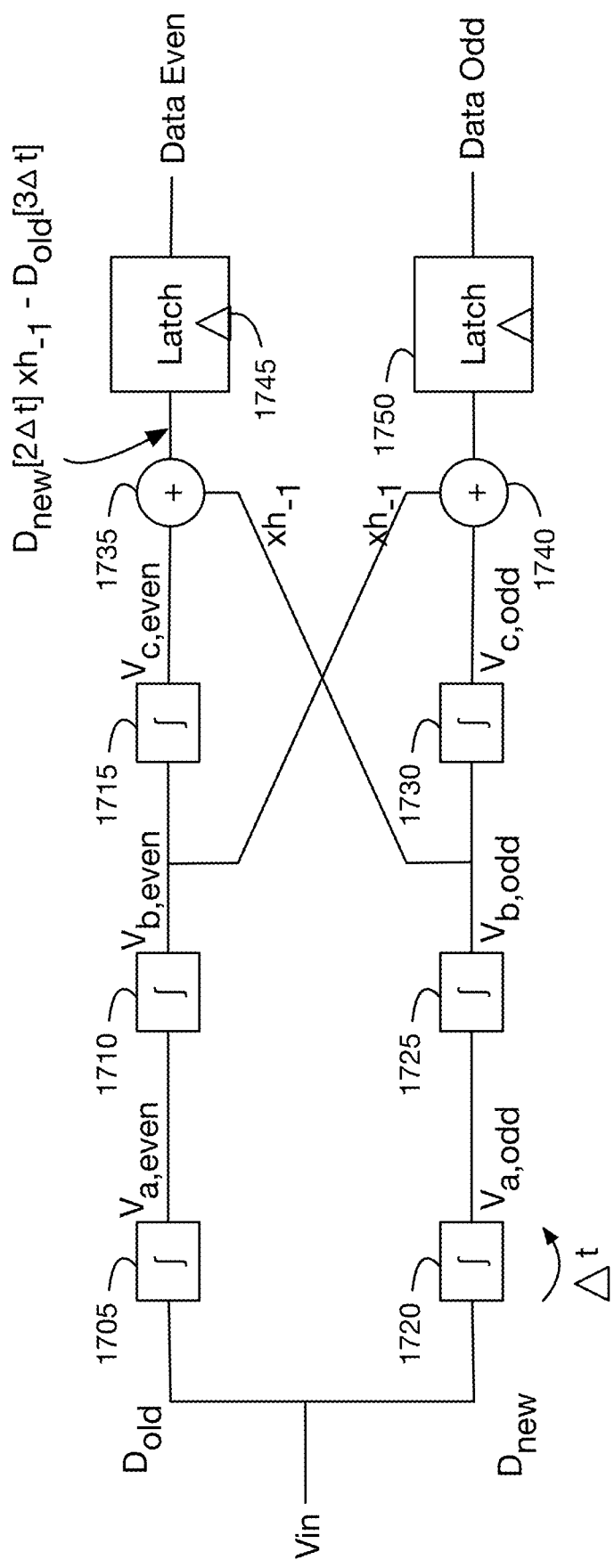
FIG. 17 is a two-phase pre-cursor compensation circuit, in accordance with some embodiments.

FIG. 17 illustrates at least one embodiment utilizing cascaded sample-and-integrate circuits for pre-cursor compensation in a two-phase system. As shown, FIG. 17 includes two phase for alternately processing received information; an odd phase including discrete-time integrator circuits (DTI) 1705, 1710, and 1715, and an even phase including discrete-time integrator circuits 1720, 1725, and 1730. As shown, each DTI may introduce an associated delay value Δt. Further, each path has a corresponding summation circuit configured to perform the pre-cursor compensation. The "odd" phase includes summation circuit 1735 configured to receive the "odd" data having a delay of 3Δt, and may combine the delayed "odd" data with differential voltage Vb from the even phase, having an associated delay Δ2t illustrated in FIG. 16B, which may have an associated DFE correction value $h_{-1}$. The summation is latched 1745, producing the output "Data Even." A similar setup for the odd processing phase is shown in the second path, using summation circuit 1740 and latch 1750 to produce output "Data Odd."

Figure 24:
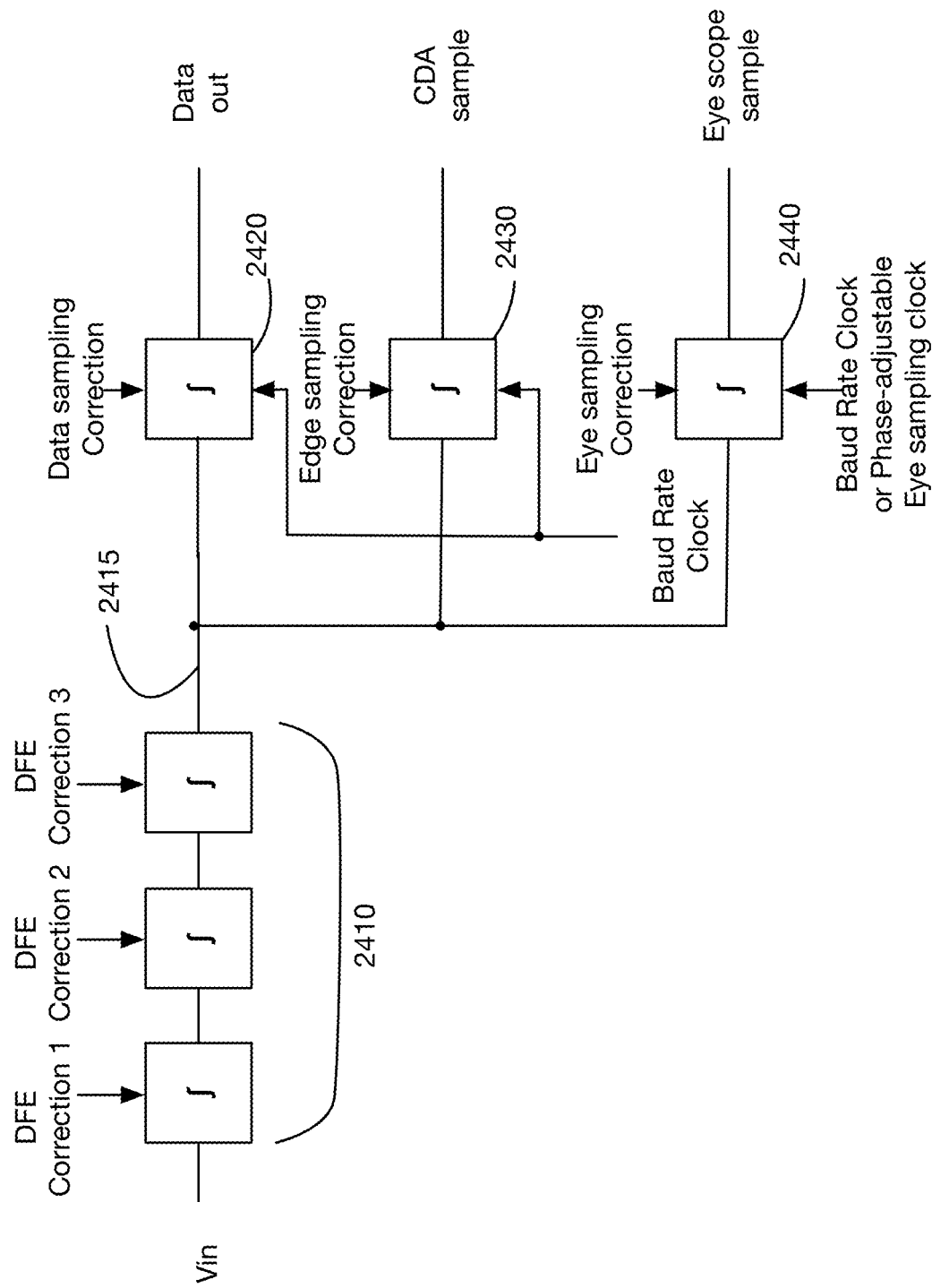
FIG. 24 illustrates a sampler/integrator stage driving multiple samplers, in accordance with some embodiments.

FIG. 24 shows another receiver embodiment, wherein a data sampler 2420 is supplemented by a clock data alignment sampler 2430 and a statistical monitoring sampler 2440, respectively obtaining received data results, timing information to enable Clock/Data Alignment adjustment of the clock generator, and statistical receive "eye" information for a command/control/monitoring subsystem. If received signal 2415 were obtained directly from the output of a linear amplification stage such as a CTLE or MIC mixer, the combined capacitive loading of the multiple sampling elements would introduce a significant frequency-domain pole impacting high-frequency response. However, introducing dynamic sampler/integrator or integrate-and-hold 2410 (in this embodiment illustrated as a cascade of three consecutive stages without implying limitation) allows signal 2415 to be driven with relative immunity from the effects of such loading, improving overall receive signal quality while simultaneously utilizing less power than a continuous-time alternative design.

In the example of FIG. 24, 2410, 2420, 2430, 2440 support an analog voltage offset input such as described with respect to the embodiment of FIG. 10. The offset inputs of 2410 are shown accepting DFE Correction values, while the offset inputs of 2420 and 2430 determine slicing levels to detect data values and timing edges, respectively. Introduction of DFE corrections in the multiple stages of 2410 allows the same corrected receive signal 2415 to be sampled for data, CDR, and eye, rather than known art approaches that would use the summation of multiple components of DFE correction to be added separately to each sampler's threshold input. This architectural flexibility may be utilized in multiple ways. In some embodiments, data sampler 2420 and clock alignment sampler 2430 are configured to receive offset correction values that are inverted with respect to each other. In such embodiments, a DFE correction value for the clock alignment sampler 2430 may provide transition information, and the output of the clock alignment sampler 2430 may correspond to an early/late timing indication used by a clock alignment circuit to adjust a phase of the baud rate clock.

In one embodiment, DFE Correction 1, DFE Correction 2, and DFE Correction 3 represent computed compensations associated with the received data value during the fourth, third, and second-most recent unit intervals, respectively. The Data sampling Correction is composed of a sampler calibration offset voltage, a sampler threshold voltage, and the computed DFE compensation associated with the received data value during the most recent preceding unit interval. The Edge sampling Correction is composed of a sampler calibration offset voltage and a sampler threshold voltage; it is observed that baud-rate CDR sampling such as utilized here may be enhanced by omission of the most-recently-received component of CDR correction. The Eye sampling Correction is composed of a sampler calibration offset voltage, an adjustable eye sampling threshold voltage, and optionally the computed DFE compensation associated with the received data value during the most recent preceding unit interval. Samplers 2420 and 2430 are triggered by a baud rate clock occurring at "center of eye".

In one particular embodiment, a single baud rate clock is used to trigger all samplers, with the offset input of 2440 being adjustable by, as one example, a command/control/monitoring subsystem, so as to obtain statistical samples of received signal level as needed to generate a graph of statistical signal amplitude data. In a further embodiment, an optional phase-adjustable Eye sampling clock is used to trigger eye sampler 2440 separately from the baud rate clock used to trigger, for example, data sampler 2420, allowing statistical signal samples to be gathered representing both amplitude and phase information.

DFE embodiments are known in which the computation of multiple unit interval compensation values are inherently summed or combined into a single result. A second embodiment applies such a combined correction at stage 2410, and optionally negates or applies the inverse correction specific to the most recent previous unit interval data to sampler 2430. Other combinations of individual DFE correction values, combined or summed DFE correction values, and fixed or adjustable offset voltages may be applied to 2410, 2420, 2430, and 2440 without limitation.

DFE Pre-Cursor Correction

The previously described DFE corrections are applied at the receiver to correct the signals currently being detected for anomalies caused by signals in previously-received unit intervals. In the common terminology of the art, these may be described as "post-cursor" corrections. "Pre-cursor" corrections are also possible, and indeed are often applied within a transmitter (where both historical and forthcoming data values to be sent are readily available) as part of so-called Finite-Impulse-Response compensation or "pre-shaping" of the transmitted waveform.

Applying pre-cursor corrections at the receiver may include passing the actual signal values to be detected through a delay, allowing "future" i.e. non-delayed received values to be applied as corrections to the delayed values, which are then sampled.

For a one Unit Interval pre-cursor correction, the received signals may be delayed by one UI. Using as a non-limiting example a receive signal stream of 25 Gbps/wire, a delay of 40 picoseconds would thus be introduced.

The received signal values may be delayed using a series of Sample-Integrate-Hold (SIH) or Sample-Hold (SH) stages. The previously-described dynamic sampler embodiments of FIGS. 3, 5, and 23 may be readily applied to this usage, as may other known art SIH and SH embodiments. It may be noted that a single instance of the sampler of FIG. 5, (e.g. 510,) provides only a short effective hold time, as the sampled signal decays from its pre-charged value through an active region, and then continues to decay to ground. However, in a sequential cascade of multiple instances of 510 clocked essentially simultaneously or with a group delay as previously described, second instance decay towards ground will be cut off as soon as the first instance output drops low enough to cut off the second instance input transistors, effectively extending the second instance hold time.

Figure 23:
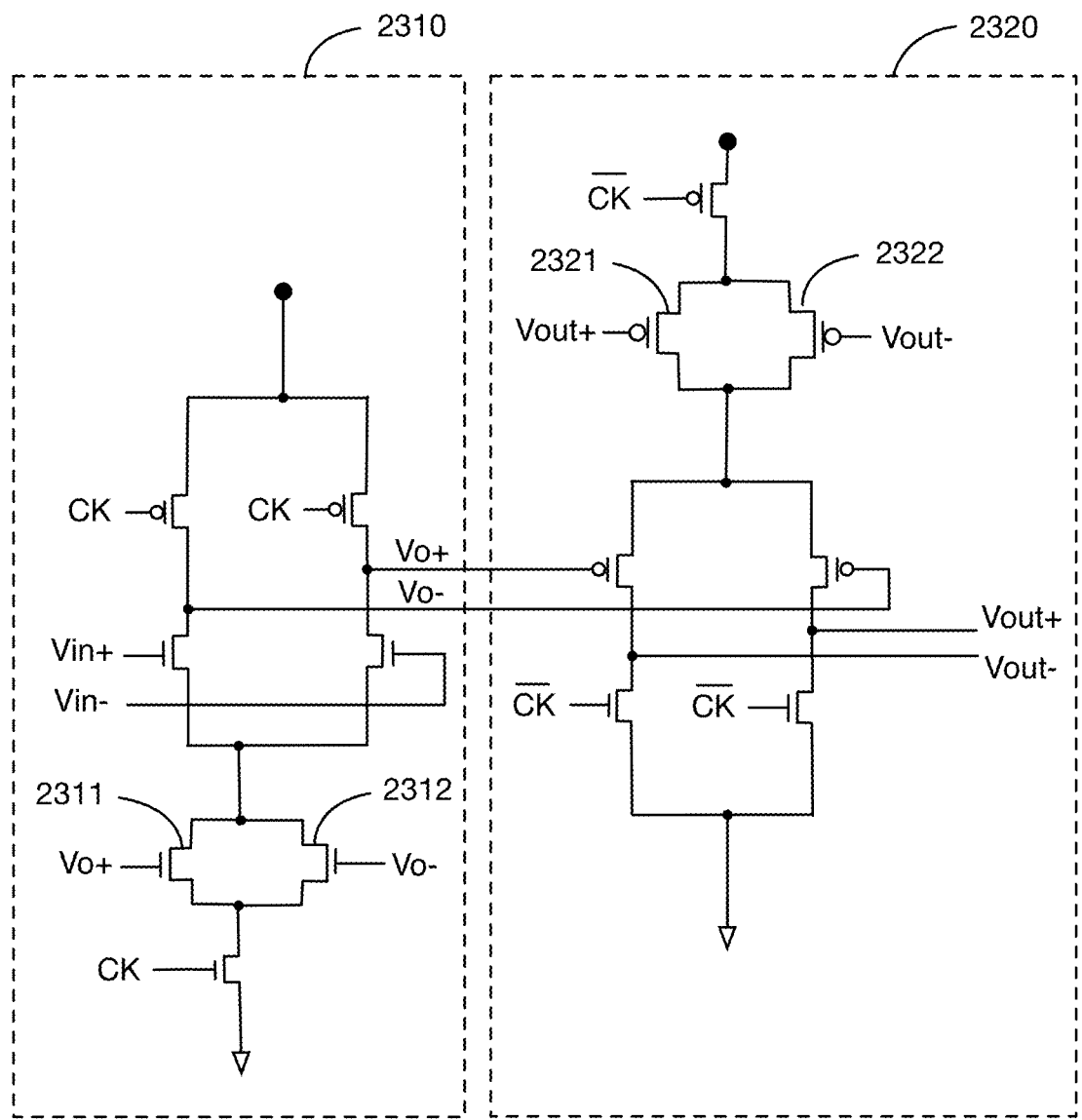
FIG. 23 illustrates a sampler/integrator stage acting as an integrate-and-hold stage, in accordance with some embodiments.

The embodiment of FIG. 23 accentuates this effect by incorporating series transistors 2311/2312 and 2321/2322 into each instance 2310, 2320, respectively, controlled by that instance's output; thus, as each output decays it cuts off that instance's discharge path, extending the effective hold time. This is a similar concept to that shown in FIG. 15B.

Figure 25:
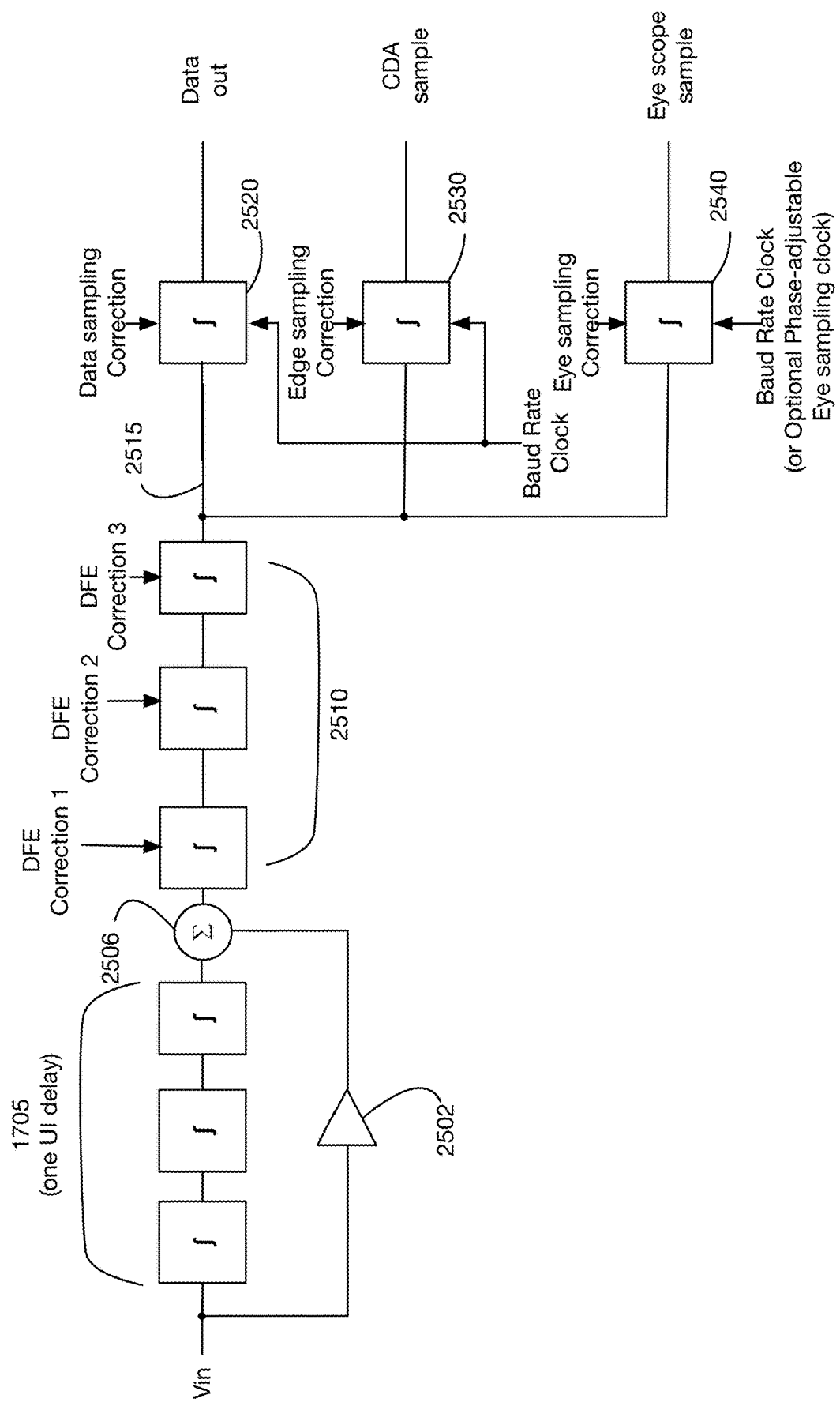
FIG. 25 illustrates pre-cursor receiver compensation, in accordance with some embodiments.

FIG. 25 shows a receiver embodiment incorporating pre-cursor compensation along with the post-cursor DFE correction of FIG. 24. Received signal Vin passes through Sample-Integrate-Hold stages 2505, which collectively represent one Unit Interval of time delay. The non-delayed signal is scaled 2502 and added 2506 to the delayed signal, providing the desired pre-cursor compensation. Then, as previously described with respect to FIG. 24, subsequent Sample-Integrate-Hold stages 2510 allow addition of DFE corrections 1, 2, 3, and receive samplers 2520, 2530, 2540 capture Data, Clock error, and Eye scope values.

Figure 22:
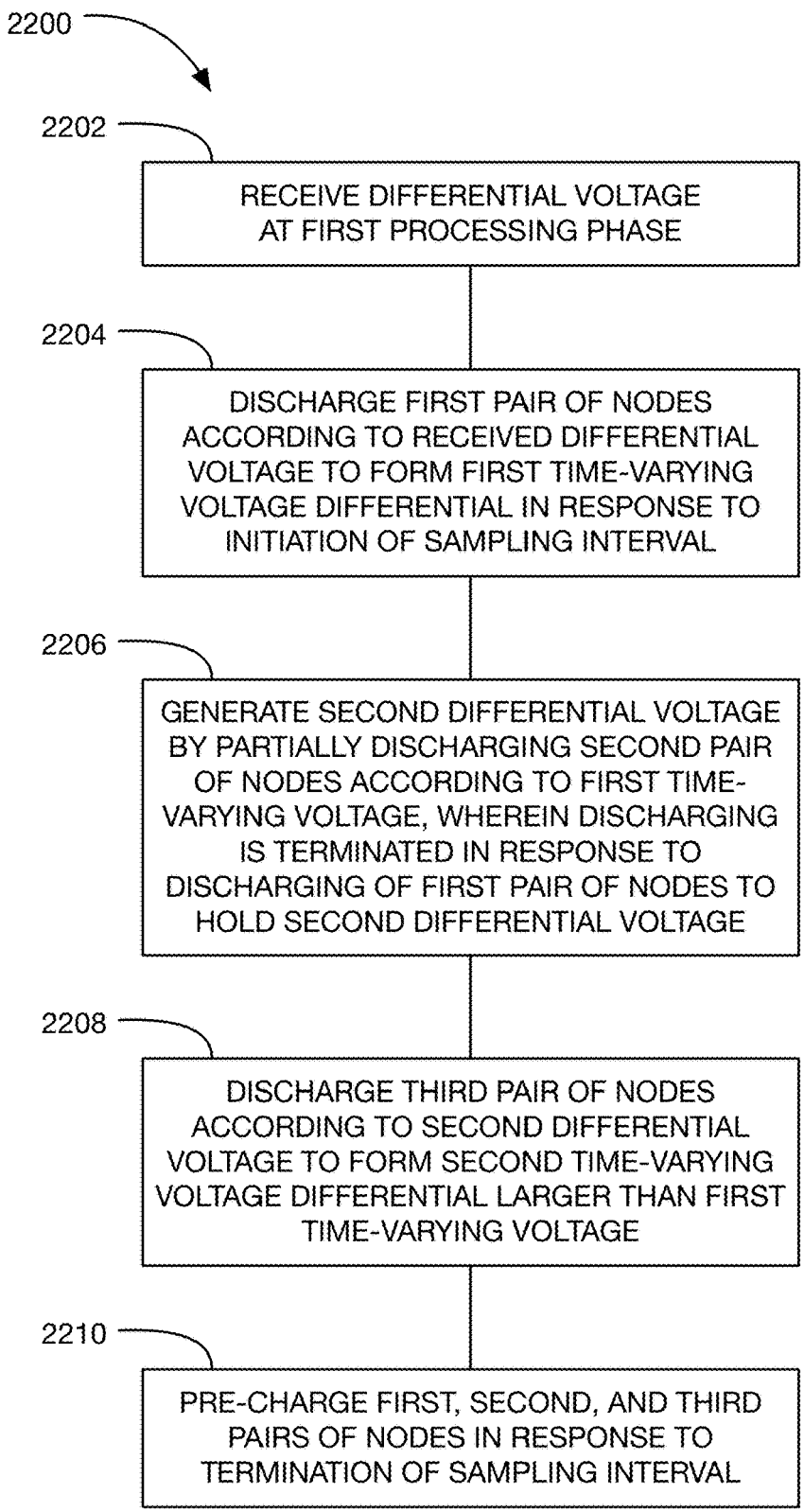
FIG. 22 is a flowchart of a method, in accordance with some embodiments.

FIG. 22 illustrates a flowchart of a method 2200, in accordance with some embodiments. As shown, method 2200 includes receiving 2202 a differential voltage at a first processing phase. In response to an initiation of a sampling interval, a first pair of nodes are discharged 2204 according to the received differential voltage to form a first time-varying voltage differential representing an integration of the differential voltage. The waveform for Va in FIG. 16B illustrates such a time-varying voltage differential in that the voltages on the pair of nodes continues to separate. A second differential voltage is generated 2206 by partially discharging a second pair of nodes. As shown in FIG. 16B, the second differential voltage Vb is generated according to the first time-varying voltage differential Va, and the discharging of the second pair of nodes is terminated in response to the discharging of the first pair of nodes. The second differential voltage Vb may then be held for a duration of the sampling interval. A third pair of nodes are discharged 2208 according to the second differential voltage to form a second time-varying voltage differential, shown in FIG. 16B as time-varying voltage differential Vc, the second time-varying voltage differential Vc representing an integration of the second differential voltage Vb similar to how time-varying voltage differential Va represented an integration of the received differential voltage. As shown in FIG. 16B, second time-varying voltage differential 1630 of Vc is larger than the first time-varying voltage differential 1610 of Va, corresponding to an amplification. Finally, the first, second, and third pairs of nodes are pre-charged 2210 in response to a termination of the sampling interval, as indicated by the falling edge of the clock signal CK.

In some embodiments, the sampling interval is initiated and terminated according to complementary edges of a sampling clock CK. In some embodiments, as described above, the discharging and pre-charging of the second and third pairs of nodes is initiated according to first and second delayed sampling clocks, respectively, the first delayed sampling clock delayed with respect to the sampling clock and the second delayed sampling clock delayed with respect to the first delayed sampling clock. An example of delayed sampling clocks is shown in FIGS. 13A and 13B where sampling clock CK2 has a delay with respect to sampling clock CK1.

In some embodiments, the discharging of the second pair of nodes is terminated in response to a full discharging of the first pair of nodes. In some embodiments, the discharging of the second pair of nodes is terminated in response to the first pair of nodes falling below a threshold voltage. In some embodiments, the threshold voltage corresponds to an operating voltage of a transistor.

In some embodiments, the method further includes providing the second differential voltage to a second processing phase. In such embodiments, the method may further include applying a differential feedback equalization (DFE) factor to the second differential voltage. In some embodiments, the method includes receiving a differential voltage from a second processing phase and adding the received differential voltage from the second processing phase to the second time-varying voltage differential. A dual processing structure associated with such embodiments is shown in FIG. 17.

For descriptive purposes the examples herein show the use of three cascaded processing stages with no limitation implied. Additional stages may be added, as examples to provide additional gain and/or provide additional corrective DC voltage magnitude inputs such as to support deeper DFE correction history, and fewer stages may be used, as examples if lower gain and/or fewer corrective DC voltage magnitude inputs suffice. Similarly, the various apparatus and methods disclosed herein may be combined with each other and with known art to, as one example, provide offset voltage adjustment and introduce a separate DFE correction voltage within a single stage, which may be an element of a multistage system.

For descriptive purposes, the examples herein describe cascaded stages of sampling elements being triggered by a single clock, introducing one clock cycle delay per stage. No limitation is implied, as triggering of individual stages may be initiated using multiple clock phases having any desired timing relationship, as long as the implementation-dependent setup and hold times for the particular embodiment are satisfied. Thus, given appropriately configured triggering clock phases, the overall delay through such a cascade may be a fraction of a clock cycle, or many clock cycles.

In some embodiments, there may be a group delay $t_1$ from when outputs Va change according to input Vin, in the case of the first stage 1110. In such embodiments, CK2 may be delayed by an amount of at least $t_1$ in order to hold a charge of VDD at the output nodes of 1120 long enough for the inputs Va to stage 1120 to settle. In some embodiments, CK1 may be put through a delay element (not shown) in order to generate clocks CK2, CK3, and CK4, the delay element introducing a delay of at least $t_n$ to each clock, where $t_n$ is the group delay associated with a given stage. In some embodiments, this group delay value may be associated with capacitances in the transistors of each stage, as well as various other factors that are known to cause group delay. In most practical embodiments, $t_n$ will be approximately the same. In some embodiments, $t_n$ is approximately 5-15 psec, however this should not be considered limiting. FIG. 11B illustrates a delay buffer for generating the clock signals CK2-CK4 based on CK1. As shown, a plurality of series-connected gates 1171, 1172, and 1173 are configured to provide clock signals CK2-CK4, respectively based on CK1. Each gate will introduce a delay corresponding to the group delay value $t_n$ described above. FIG. 13A illustrates an exemplary relationship between clocks CK1 and CK2, in accordance with some embodiments. Alternatively, clocks CK1-CK4 may be various phases of a local oscillator clock, generated using, as a non-limiting example, a PLL. FIG. 11C illustrates such an embodiment in which a local oscillator 1180 provides the four phases of the clock signals CK1-CK4 using series-connected gates 1171, 1172, 1173, and 1174. In some embodiments, each adjacent clock signal may have a relative phase relationship of 45 degrees, such as in the example shown in FIG. 11C. In alternative embodiments, each adjacent clock signal may have a relative phase relationship of 90 degrees (not shown). Such embodiments may be used as long as the analog-sampled voltages at the output nodes of a given stage do not begin to decay to VSS before the rising edge clock CK of the subsequent stage. FIG. 13B illustrates an example of clocks CK1 and CK2 having a phase offset of 45 degrees, however it should be noted that any phase offset relationship may be used as long as the phase offset relationship satisfies the above criteria.

Figure 12:
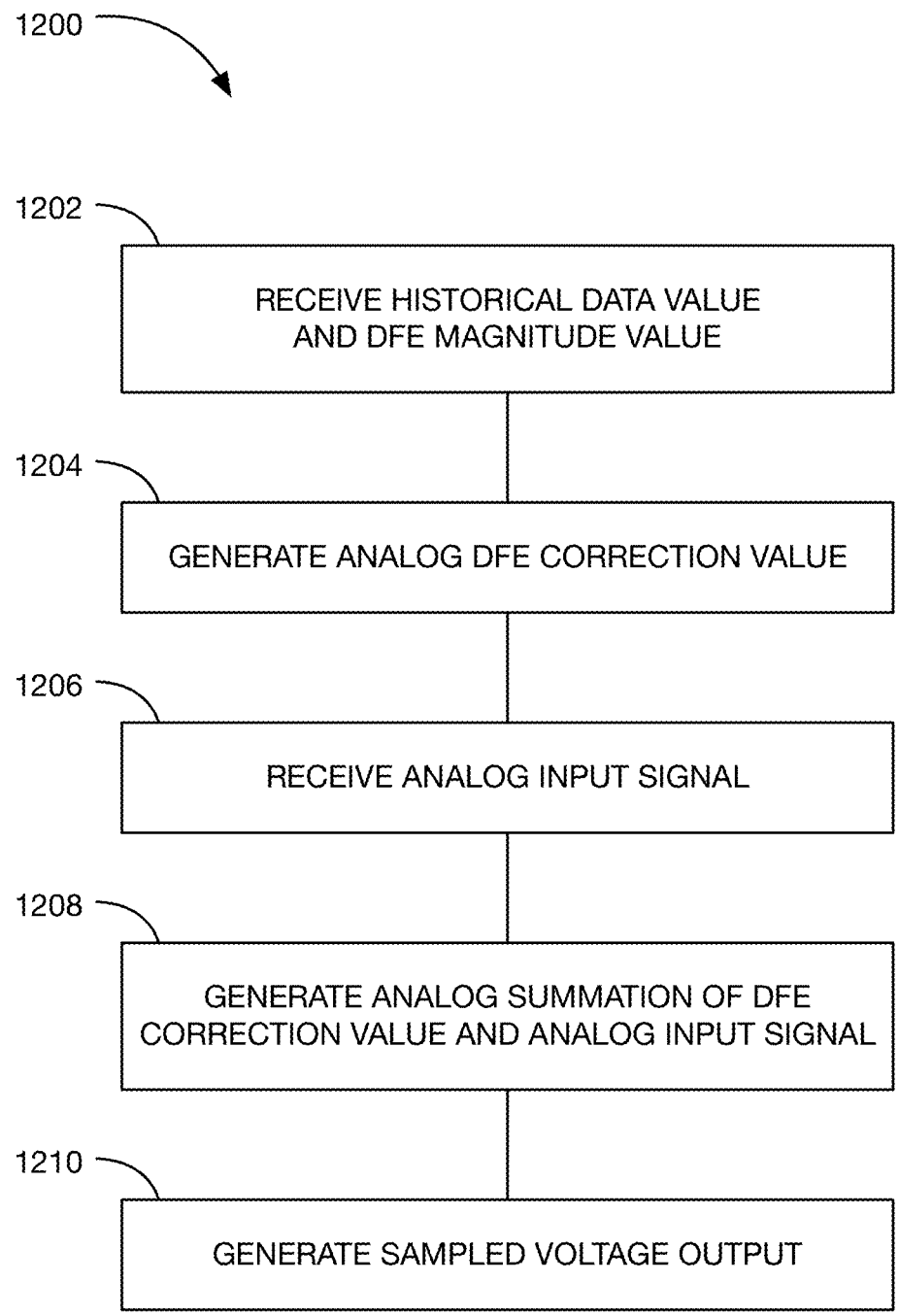
FIG. 12 is a flowchart of a method, in accordance with some embodiments.

FIG. 12 is a flowchart of a method 1200, in accordance with some embodiments. As shown, method 1200 includes receiving, at step 1202, a historical data value from a memory device storing one or more historical data values and a DFE magnitude value from a Decision-Feedback Equalization (DFE) computation circuit. At step 1204, an analog DFE correction value is generated using a decision-feedback offset generator, the analog DFE correction value having a voltage magnitude equal to the DFE magnitude value and a polarity determined by the historical data value received from the memory device. At step 1206, an analog input signal is received and responsively an analog summation of the analog DFE correction value and the received analog input signal is generated at step 1208. At step 1210, a sampler generates a sampled voltage output by sampling the analog summation according to a sampling clock.

In some embodiments, the analog input signal is a sampled voltage output received from a cascaded analog sampler. In alternative embodiments, the analog input signal corresponds to an analog output of a multi-input comparator.

In some embodiments, generating the DFE correction value includes receiving, at a pair of decision feedback branches, the DFE magnitude value in respective inverse-polarity configurations, and selecting, using a selection circuit receiving the historical data value, one of the pair of decision feedback branches to determine the polarity of the DFE correction value.

In some embodiments, the DFE magnitude value includes a high-frequency injection of the analog input signal. In some embodiments, the high-frequency injection of the analog input signal is received via a resistor-capacitor high-pass filter. In some embodiments, the DFE magnitude value comprises a voltage offset signal.

In some embodiments, the sampled voltage output has a propagation delay less than one unit-interval with respect to the received analog input signal. In alternative embodiments, the sampled voltage output has a propagation delay greater than one unit-interval with respect to the received analog input signal. In some embodiments, the memory device comprises a shift register.

Figure 14:
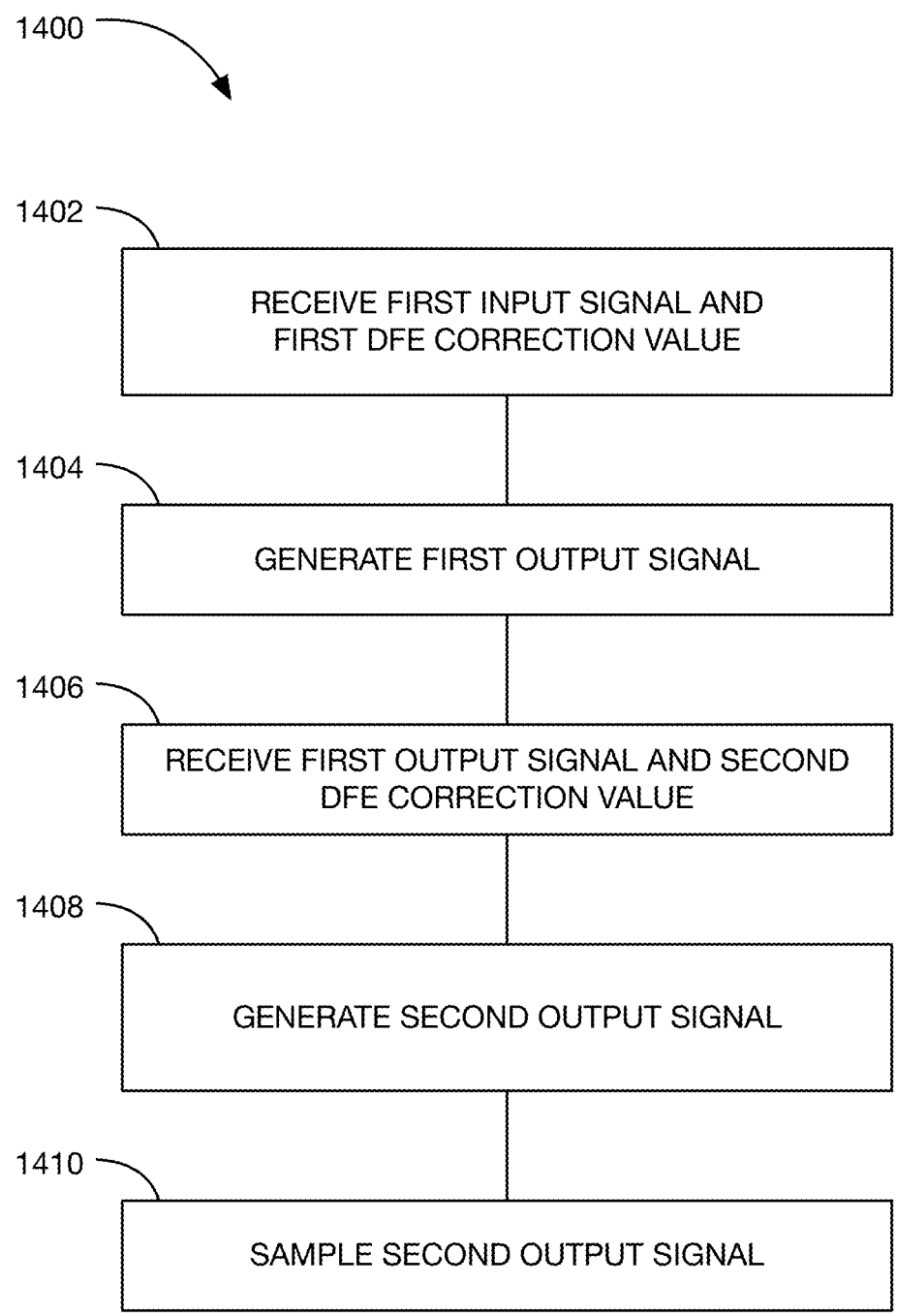
FIG. 14 illustrates a flowchart of a method, in accordance with some embodiments.

FIG. 14 is a flowchart of a method 1400, in accordance with some embodiments. As shown, a first amplifier stage receives, at step 1402, a first analog input signal and a first decision-feedback equalization (DFE) correction value, and responsively generates, at step 1404, a first analog output voltage responsive to a rising edge of a first sampling clock, the first output voltage having an associated group delay value with respect to the first input signal. At step 1406, a second amplifier stage receives the first analog output voltage and a second DFE correction value, and responsively generates, at step 1408, a second analog output voltage responsive to a rising edge of a second sampling clock, the rising edge of the second sampling clock having a delay with respect to the rising edge of the first sampling clock by an amount greater than the associated group delay value. At step 1410, a latch configured generates a sampled output data bit by sampling the second analog output voltage according to a rising edge of a third clock signal having a delay with respect to the rising edge of the second clock signal.

In some embodiments, the method includes generating the second and third clock signals using a delay element receiving the first clock signal as an input. In such embodiments, the respective delay values may be arbitrarily tuned by adjusting parameters (capacitive, etc.) of the delay element In some embodiments, the first, second, and third clock signals have respective fixed phase-offsets. In such embodiments, a phase-locked loop (PLL) generates the clock signals having fixed phase offsets.

In some embodiment, each DFE correction value has (i) a magnitude associated with a calculated DFE magnitude value and (ii) a sign determined by a historical data bit.

In some embodiments, the first received analog input signal is an analog voltage output received from a third amplifier stage.

The invention claimed is:

1. An apparatus comprising:
a memory device configured to store one or more historical data values;
a Decision-Feedback Equalization (DFE) computation circuit configured to generate a differential DFE magnitude value;
a decision-feedback offset generator configured to receive the differential DFE magnitude value at a first and a second differential pair of transistors and a historical data value of the one or more historical data values, and to responsively generate an analog DFE correction value having a voltage magnitude equal to the differential DFE magnitude value and a polarity determined via a selection of the first or the second differential pair of transistors according to the historical data value received from the memory device;
an input differential transistor pair configured to receive an analog input signal and to responsively generate an analog output signal; and
a pair of common output nodes connecting differential outputs of the decision-feedback offset generator and the input differential transistor pair, the pair of common output nodes configured to form an analog summation of the analog DFE correction value and the analog output signal.

2. The apparatus of claim 1, wherein the analog input signal is an analog voltage output received from a cascaded analog sampler.

3. The apparatus of claim 1, wherein the analog input signal corresponds to an analog voltage output of a multi-input comparator.

4. The apparatus of claim 1, wherein the first and second differential pairs of the decision-feedback offset generator are further configured to receive a high-frequency injection of the analog input signal.

5. The apparatus of claim 4, wherein the high-frequency injection of the analog input signal is received via a resistor-capacitor high-pass filter.

6. The apparatus of claim 1, wherein the first and second differential pairs of the decision-feedback offset generator are further configured to receive a voltage offset signal.

7. The apparatus of claim 6, wherein the voltage offset signal is associated with a sampler offset value.

8. The apparatus of claim 1, wherein the memory device comprises a shift register.

9. The apparatus of claim 1, further comprising a reset circuit configured to pre-charge the pair of common output nodes according to a sampling clock.

10. The apparatus of claim 9, wherein the analog summation of the analog DFE correction value and the analog output signal is formed responsive to the sampling clock.

11. A method comprising:
obtaining (i) a historical data value from a memory device storing one or more historical data values and (ii) a differential DFE magnitude value from a Decision-Feedback Equalization (DFE) computation circuit;
providing the differential DFE magnitude value to a first and a second differential pair of transistors of a decision-feedback offset generator, and responsively generating an analog DFE correction value having a voltage magnitude equal to the differential DFE magnitude value and a polarity determined via a selection of the first or the second differential pair of transistors by the historical data value;
receiving an analog input signal at an input differential pair of transistors and responsively generating an analog output signal; and
generating an analog summation of the analog DFE correction value and the analog output signal on a pair of common output nodes connecting differential outputs of the decision-feedback offset generator and the input differential pair of transistors.

12. The method of claim 11, wherein the analog input signal is an analog voltage output received from a cascaded analog sampler.

13. The method of claim 11, wherein the analog input signal corresponds to an analog voltage output of a multi-input comparator.

14. The method of claim 11, further comprising receiving a high-frequency injection of the analog input signal at the first and second differential pairs of the decision-feedback offset generator.

15. The method of claim 14, wherein the high-frequency injection of the analog input signal is received via a resistor-capacitor high-pass filter.

16. The method of claim 11, further comprising receiving a voltage offset signal at the first and second differential pairs of the decision-feedback offset generator.

17. The method of claim 16, wherein the voltage offset signal is associated with a sampler offset value.

18. The method of claim 11, wherein the memory device comprises a shift register.

19. The method of claim 11, further comprising pre-charging the pair of common output nodes according to a sampling clock using a reset circuit.

20. The method of claim 19, wherein the analog summation of the analog DFE correction value and the analog output signal is formed responsive to the sampling clock.

* * * * *